United States Patent
Stitt et al.

(10) Patent No.: US 11,395,113 B2
(45) Date of Patent: Jul. 19, 2022

(54) SYSTEM AND METHOD FOR MICROLOCATION SENSOR COMMUNICATION

(71) Applicant: DENSO CORPORATION, Kariya (JP)

(72) Inventors: Raymond Michael Stitt, Ada, MI (US); Eric John Smith, Holland, MI (US); Tyler Lloyd Zoerner, Kentwood, MI (US)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/031,116

(22) Filed: Sep. 24, 2020

(65) Prior Publication Data

US 2021/0021973 A1    Jan. 21, 2021

Related U.S. Application Data

(63) Continuation of application No. 16/511,741, filed on Jul. 15, 2019, now Pat. No. 10,820,173, which is a continuation of application No. 15/852,396, filed on Dec. 22, 2017, now Pat. No. 10,362,461.

(60) Provisional application No. 62/439,322, filed on Dec. 27, 2016.

(51) Int. Cl.
| | |
|---|---|
| *H04W 4/38* | (2018.01) |
| *H04W 4/80* | (2018.01) |
| *H04W 4/70* | (2018.01) |
| *H04W 84/18* | (2009.01) |

(52) U.S. Cl.
CPC .............. *H04W 4/38* (2018.02); *H04W 4/70* (2018.02); *H04W 4/80* (2018.02); *H04W 84/18* (2013.01)

(58) Field of Classification Search
CPC ...... G07C 9/00007; H04W 4/38; H04W 4/70; H04W 4/80; H04W 84/18
USPC ................................................ 455/41.2, 41.1
See application file for complete search history.

(56) References Cited

U.S. PATENT DOCUMENTS

| | | | | |
|---|---|---|---|---|
| 5,867,292 A | * | 2/1999 | Crimmins .......... | H04B 10/1149 398/103 |
| 6,426,819 B1 | * | 7/2002 | Crimmins .......... | H04B 10/1149 370/347 |
| 6,937,617 B2 | * | 8/2005 | Rakib ...................... | H04N 7/10 370/479 |
| 7,277,637 B2 | * | 10/2007 | Jette ........................ | H04J 14/02 398/70 |
| 7,761,591 B2 | * | 7/2010 | Graham ................. | G06Q 40/02 709/227 |
| 7,762,470 B2 | * | 7/2010 | Finn ........................ | H04H 60/63 235/487 |

(Continued)

OTHER PUBLICATIONS

International Search Report and the Written Opinion of the International Searching Authority for International Application No. PCT/US2017/068172 dated Apr. 23, 2018.

*Primary Examiner* — Hai V Nguyen
(74) *Attorney, Agent, or Firm* — Warner Norcross + Judd LLP

(57) ABSTRACT

A system and a method to wirelessly synchronize, monitor, or communicate, or a combination thereof, amongst sensors (e.g., sensors, hubs, sensor controllers, etc.) in a Bluetooth Low Energy-based microlocation system. The system or method, or both, may use the BLE hardware (e.g., transmitters, receivers, antennas, etc.) to interleave a communications protocol within the connection interval gaps of the BLE protocol used to communicate with devices.

20 Claims, 12 Drawing Sheets

(56) References Cited

U.S. PATENT DOCUMENTS

| | | | | |
|---|---|---|---|---|
| 7,978,062 B2* | 7/2011 | LaLonde | | A61B 5/0026 |
| | | | | 340/539.11 |
| 8,005,465 B2* | 8/2011 | Salokannel | | H04W 4/80 |
| | | | | 455/414.3 |
| 8,045,922 B2* | 10/2011 | Sherman | | H04W 16/14 |
| | | | | 370/328 |
| 8,319,605 B2* | 11/2012 | Hassan | | H04B 7/0608 |
| | | | | 340/447 |
| 8,712,330 B2* | 4/2014 | Desai | | H04B 17/318 |
| | | | | 455/67.11 |
| 8,786,680 B2* | 7/2014 | Shiratori | | G06V 40/23 |
| | | | | 345/473 |
| 8,847,754 B2* | 9/2014 | Buchheim | | G01S 1/725 |
| | | | | 455/457 |
| 8,930,045 B2* | 1/2015 | Oman | | B60R 25/245 |
| | | | | 340/426.36 |
| 9,064,390 B1* | 6/2015 | Clark | | G08B 5/36 |
| 9,111,221 B1* | 8/2015 | Kelly | | G08B 13/19 |
| 9,114,720 B2* | 8/2015 | Oman | | G01R 29/00 |
| 9,154,826 B2* | 10/2015 | Raleigh | | H04N 21/25808 |
| 9,253,663 B2* | 2/2016 | Raleigh | | H04W 24/02 |
| 9,258,695 B2* | 2/2016 | Kasslin | | H04W 4/80 |
| 9,371,072 B1* | 6/2016 | Sisbot | | G06V 20/58 |
| 9,380,119 B2* | 6/2016 | Kasslin | | H04W 8/005 |
| 9,386,401 B2* | 7/2016 | Gold | | H04W 4/023 |
| 9,398,437 B2* | 7/2016 | Kasslin | | H04W 4/80 |
| 9,414,426 B2* | 8/2016 | Park | | H04W 76/19 |
| 9,483,887 B1* | 11/2016 | Soleimani | | G07C 9/00571 |
| 9,542,678 B1* | 1/2017 | Glashan | | G06Q 20/325 |
| 9,553,943 B1* | 1/2017 | DeLuca | | H04W 4/021 |
| 9,566,945 B2* | 2/2017 | Ghabra | | B60R 25/245 |
| 9,613,475 B2* | 4/2017 | Zivkovic | | G07C 9/20 |
| 9,618,918 B2* | 4/2017 | O'Keeffe | | G06N 20/00 |
| 9,622,159 B2* | 4/2017 | Buttolo | | H04W 48/16 |
| 9,635,118 B1* | 4/2017 | DeLuca | | G01S 5/14 |
| 9,641,239 B2* | 5/2017 | Panther | | H04B 7/26 |
| 9,668,209 B1* | 5/2017 | Knaappila | | H04W 4/023 |
| 9,681,827 B2* | 6/2017 | Huang | | G16Z 99/00 |
| 9,693,127 B2* | 6/2017 | Kim | | H04W 84/20 |
| 9,712,266 B2* | 7/2017 | Linde | | H04W 4/80 |
| 9,734,386 B2* | 8/2017 | Sprigg | | G06V 10/17 |
| 9,744,852 B2* | 8/2017 | Buttolo | | B60K 35/00 |
| 9,747,740 B2* | 8/2017 | Buttolo | | G07C 9/0069 |
| 9,769,597 B2* | 9/2017 | Jin | | H04W 4/80 |
| 9,783,158 B2* | 10/2017 | Caushi | | G07C 9/00658 |
| 9,794,753 B1* | 10/2017 | Stitt | | G06F 21/31 |
| 9,794,934 B2* | 10/2017 | Zhang | | H04W 8/005 |
| 9,802,574 B2* | 10/2017 | Jakobsson | | G07C 9/00309 |
| 9,832,578 B2* | 11/2017 | Pope | | H04L 65/60 |
| 9,860,684 B2* | 1/2018 | Jin | | H04W 76/25 |
| 9,860,710 B2* | 1/2018 | Buttolo | | H04W 4/021 |
| 9,892,293 B1* | 2/2018 | Wade | | G06K 7/10277 |
| 9,907,147 B2* | 2/2018 | Chen | | F21V 14/06 |
| 9,911,259 B1* | 3/2018 | Ghabra | | G07C 9/00309 |
| 9,911,290 B1* | 3/2018 | Zalewski | | G06Q 30/0633 |
| 9,914,415 B2* | 3/2018 | Buttolo | | G06F 3/0481 |
| 9,914,418 B2* | 3/2018 | Buttolo | | B60R 16/037 |
| 9,928,199 B2* | 3/2018 | Motos | | G06F 13/4022 |
| 9,948,349 B2* | 4/2018 | Malach | | H04W 4/80 |
| 9,967,713 B2* | 5/2018 | Buchheim | | H04W 4/80 |
| 9,967,717 B2* | 5/2018 | Buttolo | | B60K 35/00 |
| 9,988,014 B2* | 6/2018 | Parasurama | | B60R 25/1012 |
| 9,998,581 B1* | 6/2018 | Noxon | | H04W 4/80 |
| 10,004,079 B2* | 6/2018 | Palin | | H04W 72/082 |
| 10,026,287 B2* | 7/2018 | Sarkar | | G08B 13/2465 |
| 10,034,159 B2* | 7/2018 | Deck | | H04L 43/16 |
| 10,034,160 B2* | 7/2018 | Song | | H04L 1/1607 |
| 10,046,637 B2* | 8/2018 | Buttolo | | G06F 3/04845 |
| 10,062,073 B2* | 8/2018 | Baldie | | G06Q 20/40 |
| 10,075,623 B2* | 9/2018 | Roozeboom | | H04N 5/45 |
| 10,091,242 B2* | 10/2018 | Britt | | H04W 12/50 |
| 10,108,892 B2* | 10/2018 | Sengstaken, Jr. | | A61J 7/04 |
| 10,127,409 B1* | 11/2018 | Wade | | G06F 21/86 |
| 10,165,397 B2* | 12/2018 | Connelly | | H04W 72/048 |
| 10,212,494 B1* | 2/2019 | Struhsaker | | H04W 4/80 |
| 10,225,098 B2* | 3/2019 | Gu | | H04L 12/2838 |
| 10,271,766 B1* | 4/2019 | Parker, Jr. | | A61B 5/0836 |
| 10,328,898 B2* | 6/2019 | Golsch | | G01S 5/04 |
| 10,328,899 B2* | 6/2019 | Golsch | | B60R 25/245 |
| 10,348,635 B2* | 7/2019 | Kuang | | H04L 47/6275 |
| 10,362,461 B2* | 7/2019 | Stitt | | H04W 4/38 |
| 10,381,831 B2* | 8/2019 | Tomar | | G05B 13/0265 |
| 10,412,580 B2* | 9/2019 | Glashan | | G06Q 20/327 |
| 10,565,577 B2* | 2/2020 | Peri | | G06Q 20/3224 |
| 10,820,173 B2* | 10/2020 | Stitt | | H04W 4/70 |
| 10,945,105 B1* | 3/2021 | Konen | | H04W 76/15 |
| 11,012,659 B2* | 5/2021 | Mukherjee | | H04N 21/44218 |
| 2002/0165006 A1 | 11/2002 | Haller | | H04L 41/00 |
| | | | | 455/556.1 |
| 2003/0219768 A1* | 11/2003 | Beebe | | A61P 35/00 |
| | | | | 435/7.1 |
| 2004/0000993 A1* | 1/2004 | Lu | | G08B 21/0263 |
| | | | | 340/988 |
| 2005/0058102 A1* | 3/2005 | Santhoff | | H04B 1/7163 |
| | | | | 370/320 |
| 2005/0249122 A1* | 11/2005 | Wheeler | | H04W 40/02 |
| | | | | 370/328 |
| 2006/0171327 A1* | 8/2006 | Durand | | H04W 16/14 |
| | | | | 370/252 |
| 2007/0133736 A1* | 6/2007 | Chen | | A61B 6/00 |
| | | | | 378/5 |
| 2007/0197261 A1* | 8/2007 | Humbel | | H04L 63/0853 |
| | | | | 455/558 |
| 2008/0109302 A1* | 5/2008 | Salokannel | | H04W 4/80 |
| | | | | 705/14.1 |
| 2008/0159220 A1* | 7/2008 | Kitchin | | H04L 5/023 |
| | | | | 370/329 |
| 2008/0180228 A1* | 7/2008 | Wakefield | | G08C 17/02 |
| | | | | 340/4.62 |
| 2008/0262669 A1* | 10/2008 | Smid | | G05D 1/0278 |
| | | | | 701/23 |
| 2008/0301799 A1* | 12/2008 | Arnold | | G06F 21/6218 |
| | | | | 726/14 |
| 2009/0086619 A1* | 4/2009 | Santhoff | | H04B 1/7163 |
| | | | | 370/208 |
| 2009/0109971 A1* | 4/2009 | Rozen | | H04L 1/1874 |
| | | | | 370/389 |
| 2009/0137206 A1* | 5/2009 | Sherman | | H04W 16/14 |
| | | | | 455/41.2 |
| 2010/0008338 A1* | 1/2010 | Tsfati | | H04B 1/0067 |
| | | | | 455/41.2 |
| 2010/0054138 A1* | 3/2010 | Gips | | H04L 67/12 |
| | | | | 370/248 |
| 2010/0121413 A1* | 5/2010 | Willerton | | A61N 1/37235 |
| | | | | 607/60 |
| 2010/0305779 A1* | 12/2010 | Hassan | | H04B 7/0608 |
| | | | | 701/2 |
| 2010/0317289 A1* | 12/2010 | Desai | | H04B 17/318 |
| | | | | 455/41.2 |
| 2011/0027771 A1* | 2/2011 | Deng | | G01N 33/80 |
| | | | | 435/5 |
| 2012/0196534 A1* | 8/2012 | Kasslin | | H04W 76/40 |
| | | | | 455/41.2 |
| 2012/0220351 A1* | 8/2012 | Kerai | | H04W 84/20 |
| | | | | 455/574 |
| 2012/0221075 A1* | 8/2012 | Bentwich | | G16H 50/30 |
| | | | | 607/45 |
| 2012/0327194 A1* | 12/2012 | Shiratori | | G06F 3/011 |
| | | | | 348/47 |
| 2013/0034005 A1* | 2/2013 | Xhafa | | H04W 76/10 |
| | | | | 370/252 |
| 2014/0086125 A1* | 3/2014 | Polo | | H04W 52/0229 |
| | | | | 370/311 |
| 2014/0101472 A1* | 4/2014 | Rohrweck | | G06F 1/3206 |
| | | | | 713/323 |
| 2014/0135042 A1* | 5/2014 | Buchheim | | G01S 1/725 |
| | | | | 455/566 |
| 2014/0254466 A1* | 9/2014 | Wurster | | H04L 51/18 |
| | | | | 370/312 |

(56) References Cited

U.S. PATENT DOCUMENTS

| | | | |
|---|---|---|---|
| 2014/0273858 A1* | 9/2014 | Panther | A61B 5/1123 455/41.2 |
| 2014/0292481 A1* | 10/2014 | Dumas | G07C 9/28 340/5.61 |
| 2014/0348327 A1* | 11/2014 | Linde | H04H 20/88 381/2 |
| 2014/0370917 A1* | 12/2014 | Buchheim | H04W 4/023 455/456.1 |
| 2014/0372185 A1* | 12/2014 | Ganot | G07B 15/02 705/13 |
| 2015/0015193 A1* | 1/2015 | Oman | B60L 53/126 320/108 |
| 2015/0092642 A1* | 4/2015 | Geboff | H04L 69/329 370/350 |
| 2015/0100245 A1* | 4/2015 | Huang | A61B 5/1118 600/509 |
| 2015/0111552 A1* | 4/2015 | Kaye | H04W 4/12 455/552.1 |
| 2015/0123813 A1* | 5/2015 | Hernandez-Rosas | A61B 5/14503 340/870.02 |
| 2015/0153810 A1* | 6/2015 | Sasidharan | G06F 1/329 713/320 |
| 2015/0172391 A1* | 6/2015 | Kasslin | H04L 67/16 370/338 |
| 2015/0172901 A1* | 6/2015 | Kasslin | H04W 4/80 370/328 |
| 2015/0172902 A1* | 6/2015 | Kasslin | H04W 4/80 370/328 |
| 2015/0195099 A1* | 7/2015 | Imes | G05B 15/02 700/275 |
| 2015/0221194 A1* | 8/2015 | Sarkar | G08B 13/2402 340/870.16 |
| 2015/0230285 A1* | 8/2015 | Park | H04W 76/19 455/41.2 |
| 2015/0235486 A1* | 8/2015 | Ellis | G07C 9/00309 340/5.61 |
| 2015/0256413 A1* | 9/2015 | Du | H04L 41/12 370/242 |
| 2015/0264626 A1* | 9/2015 | Perdomo | H04L 67/125 370/216 |
| 2015/0271255 A1* | 9/2015 | Mackay | H04L 45/121 709/226 |
| 2015/0271629 A1* | 9/2015 | Knaappila | H04W 4/80 455/41.2 |
| 2015/0278140 A1* | 10/2015 | Motos | G06F 13/4022 710/317 |
| 2015/0334488 A1* | 11/2015 | Kim | H04W 76/00 381/2 |
| 2015/0364143 A1* | 12/2015 | Abildgren | H04R 5/04 381/23 |
| 2015/0369618 A1* | 12/2015 | Barnard | G01S 19/13 701/491 |
| 2015/0373749 A1* | 12/2015 | Palin | H04W 76/10 455/41.2 |
| 2015/0379795 A1* | 12/2015 | Wu | G07C 9/00309 340/5.61 |
| 2016/0006436 A1* | 1/2016 | Feldstein | H03K 17/9622 200/5 A |
| 2016/0014550 A1* | 1/2016 | Chiddarwar | H04W 4/80 455/41.2 |
| 2016/0021239 A1* | 1/2016 | Iwai | H04W 24/02 455/422.1 |
| 2016/0037486 A1* | 2/2016 | Wentzloff | H04W 4/80 370/329 |
| 2016/0043827 A1* | 2/2016 | Filson | H04L 45/22 370/252 |
| 2016/0078277 A1* | 3/2016 | Sprigg | G06V 10/17 382/119 |
| 2016/0105762 A1* | 4/2016 | Singh | H04W 4/80 455/41.2 |
| 2016/0123619 A1* | 5/2016 | Hester | G05B 13/0265 700/276 |
| 2016/0127875 A1* | 5/2016 | Zampini, II | H04W 52/0296 370/311 |
| 2016/0150298 A1* | 5/2016 | Kim | H04Q 9/00 340/870.02 |
| 2016/0163159 A1* | 6/2016 | Arnone | G07F 17/3237 463/25 |
| 2016/0225211 A1* | 8/2016 | Gehin | H04L 67/12 |
| 2016/0249356 A1* | 8/2016 | Pope | H04W 4/80 |
| 2016/0255697 A1* | 9/2016 | Bhide | F21V 23/045 315/161 |
| 2016/0255704 A1* | 9/2016 | Mueller | H05B 47/19 315/307 |
| 2016/0262193 A1* | 9/2016 | Hariharan | H04W 76/10 |
| 2016/0276873 A1* | 9/2016 | Ben Hanoch | H02J 7/00034 |
| 2016/0284185 A1* | 9/2016 | Maison | G06Q 10/0833 |
| 2016/0286629 A1* | 9/2016 | Chen | H05B 47/19 |
| 2016/0295078 A1* | 10/2016 | Roozeboom | G11B 20/10527 |
| 2016/0302195 A1* | 10/2016 | Zhang | H04W 4/80 |
| 2016/0314818 A1* | 10/2016 | Kirk | G06F 1/163 |
| 2016/0315470 A1* | 10/2016 | Tomar | G05B 13/0265 |
| 2016/0337223 A1* | 11/2016 | Mackay | H04L 43/12 |
| 2016/0373185 A1* | 12/2016 | Wentzloff | H04B 7/26 |
| 2016/0381637 A1* | 12/2016 | Kvetny | H04L 67/28 370/311 |
| 2017/0017214 A1* | 1/2017 | O'Keeffe | G05B 15/02 |
| 2017/0019144 A1* | 1/2017 | Malach | H04W 4/80 |
| 2017/0041759 A1* | 2/2017 | Gantert | G06Q 20/34 |
| 2017/0055126 A1* | 2/2017 | O'Keeffe | H04W 4/21 |
| 2017/0094452 A1* | 3/2017 | Kamijo | H04W 4/80 |
| 2017/0098374 A1* | 4/2017 | Sullivan | G08G 1/0129 |
| 2017/0150374 A1* | 5/2017 | Abadi | H04W 48/10 |
| 2017/0164420 A1* | 6/2017 | Tan | G08C 17/02 |
| 2017/0171747 A1* | 6/2017 | Britt | H04W 12/0431 |
| 2017/0176964 A1* | 6/2017 | O'Keeffe | G06N 20/00 |
| 2017/0178103 A1* | 6/2017 | Peri | G07G 3/00 |
| 2017/0180933 A1* | 6/2017 | Steiner | H04W 4/023 |
| 2017/0188181 A1* | 6/2017 | Jin | H04W 76/15 |
| 2017/0188182 A1* | 6/2017 | Jin | H04L 27/12 |
| 2017/0195424 A1* | 7/2017 | Nasir | H04W 4/80 |
| 2017/0215742 A1* | 8/2017 | Wisbey | A61B 5/6803 |
| 2017/0220985 A1* | 8/2017 | White | H04L 67/2833 |
| 2017/0238140 A9* | 8/2017 | Buchheim | H04W 4/026 455/456.1 |
| 2017/0245106 A1* | 8/2017 | Connelly | H04W 72/048 |
| 2017/0256148 A1* | 9/2017 | King | G08B 13/196 |
| 2017/0257162 A1* | 9/2017 | Panther | H04B 5/0031 |
| 2017/0265025 A1* | 9/2017 | Deck | H04W 4/80 |
| 2017/0272270 A1* | 9/2017 | Gu | H04W 4/80 |
| 2017/0272317 A1* | 9/2017 | Singla | H04L 67/02 |
| 2017/0284903 A1* | 10/2017 | Anderson | G01M 99/008 |
| 2017/0289738 A1* | 10/2017 | Jepson | H04W 4/80 |
| 2017/0289795 A1* | 10/2017 | Glashan | G06Q 20/325 |
| 2017/0303070 A1* | 10/2017 | Batra | H04W 48/14 |
| 2017/0303076 A1* | 10/2017 | Song | H04L 1/1607 |
| 2017/0303080 A1* | 10/2017 | Stitt | H04W 4/80 |
| 2017/0303090 A1* | 10/2017 | Stitt | H04W 12/06 |
| 2017/0303094 A1* | 10/2017 | Collar | H04L 41/069 |
| 2017/0311874 A1* | 11/2017 | Simonetti | A61B 5/6829 |
| 2017/0353933 A1* | 12/2017 | Xhafa | H04W 76/25 |
| 2018/0011694 A1* | 1/2018 | Al-Fuqaha | G06F 8/36 |
| 2018/0027077 A1* | 1/2018 | Melodia | H04L 67/12 370/254 |
| 2018/0034583 A1* | 2/2018 | Low | H04L 1/0057 |
| 2018/0035247 A1* | 2/2018 | Raghu | H04W 76/10 |
| 2018/0041861 A1* | 2/2018 | Zhang | H04W 48/12 |
| 2018/0045519 A1* | 2/2018 | Ghadiok | G06V 10/40 |
| 2018/0054231 A1* | 2/2018 | Malach | H04B 1/48 |
| 2018/0056936 A1* | 3/2018 | Parasurama | B60R 25/1001 |
| 2018/0063694 A1* | 3/2018 | Lim | H04W 8/005 |
| 2018/0075330 A1* | 3/2018 | Sengstaken, Jr. | G06K 19/0723 |
| 2018/0075380 A1* | 3/2018 | Perl | G06Q 50/30 |
| 2018/0083884 A1* | 3/2018 | Kuang | H04L 67/1074 |
| 2018/0084419 A1* | 3/2018 | Sun | H04L 9/08 |
| 2018/0089410 A1* | 3/2018 | Caso | G07C 9/22 |
| 2018/0091939 A1* | 3/2018 | Venkatraman | H04W 4/021 |
| 2018/0096329 A1* | 4/2018 | Hamilton | G06Q 20/322 |

(56) References Cited

U.S. PATENT DOCUMENTS

| | | | |
|---|---|---|---|
| 2018/0096330 A1* | 4/2018 | Hamilton | G06Q 20/20 |
| 2018/0099643 A1* | 4/2018 | Golsch | H04W 4/30 |
| 2018/0103414 A1* | 4/2018 | Golsch | B60R 25/245 |
| 2018/0109999 A1* | 4/2018 | Finnegan | G05B 15/02 |
| 2018/0112983 A1* | 4/2018 | Ahmed | G01C 21/165 |
| 2018/0123804 A1* | 5/2018 | Smith | H04L 9/0825 |
| 2018/0126901 A1* | 5/2018 | Levkova | G06V 20/597 |
| 2018/0132061 A1* | 5/2018 | Bitra | H04L 5/0048 |
| 2018/0132092 A1* | 5/2018 | Choi | H04W 8/005 |
| 2018/0139565 A1* | 5/2018 | Norris | H04S 1/007 |
| 2018/0139569 A1* | 5/2018 | Padgett | G07C 9/00904 |
| 2018/0152972 A1* | 5/2018 | Wu | H04W 52/0216 |
| 2018/0167877 A1* | 6/2018 | Guzik | H04W 4/06 |
| 2018/0172664 A1* | 6/2018 | Love | G16H 40/67 |
| 2018/0182491 A1* | 6/2018 | Belliveau | G16H 20/17 |
| 2018/0184268 A1* | 6/2018 | Stitt | H04W 4/70 |
| 2018/0270659 A1* | 9/2018 | Chen | H04W 76/10 |
| 2018/0278462 A1* | 9/2018 | Bjontegard | A63F 13/213 |
| 2018/0290627 A1* | 10/2018 | Hariri | B60R 25/245 |
| 2018/0293861 A1* | 10/2018 | Sarkar | G08B 13/2465 |
| 2018/0302189 A1* | 10/2018 | Harrod, IV | H04L 1/08 |
| 2018/0335514 A1* | 11/2018 | Dees | G01S 7/36 |
| 2018/0365677 A1* | 12/2018 | Baldie | G06Q 20/3224 |
| 2019/0007584 A1* | 1/2019 | Roozeboom | H04N 5/45 |
| 2019/0007924 A1* | 1/2019 | Chen | H04W 64/003 |
| 2019/0037018 A1* | 1/2019 | Scurrell | H04L 67/10 |
| 2019/0064750 A1* | 2/2019 | Awiszus | A62B 9/006 |
| 2019/0088096 A1* | 3/2019 | King | G08B 13/1436 |
| 2019/0163848 A1* | 5/2019 | McGranahan | G06N 20/00 |
| 2019/0254076 A1* | 8/2019 | Siomina | H04W 76/27 |
| 2019/0263356 A1* | 8/2019 | Golsch | G01S 13/765 |
| 2019/0263357 A1* | 8/2019 | Golsch | B60R 25/24 |
| 2019/0290181 A1* | 9/2019 | Mrvaljevic | A61B 5/00 |
| 2019/0313202 A1* | 10/2019 | Connelly | H04W 4/021 |
| 2019/0317177 A1* | 10/2019 | Ertan | G01S 3/46 |
| 2019/0342728 A1* | 11/2019 | Stitt | H04W 4/38 |
| 2020/0028687 A1* | 1/2020 | Castet | H04W 4/80 |
| 2020/0137817 A1* | 4/2020 | Smith | G01S 5/0284 |
| 2020/0145079 A1* | 5/2020 | Marinier | H04B 7/0404 |
| 2020/0294401 A1* | 9/2020 | Kerecsen | G05D 1/0287 |

* cited by examiner

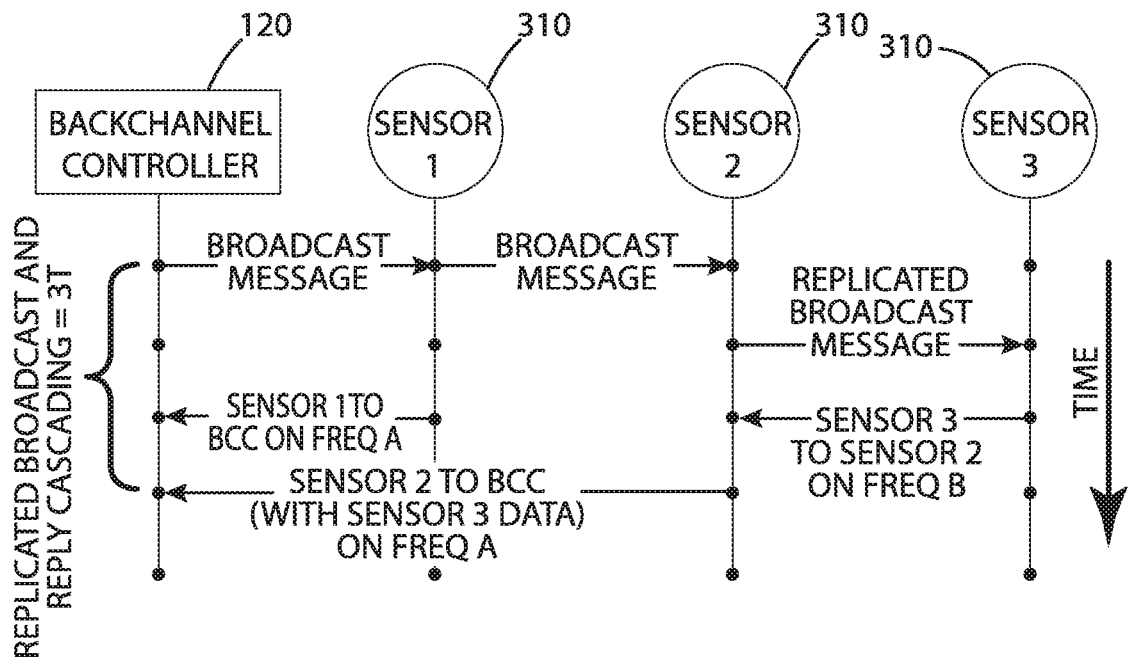
Fig. 10
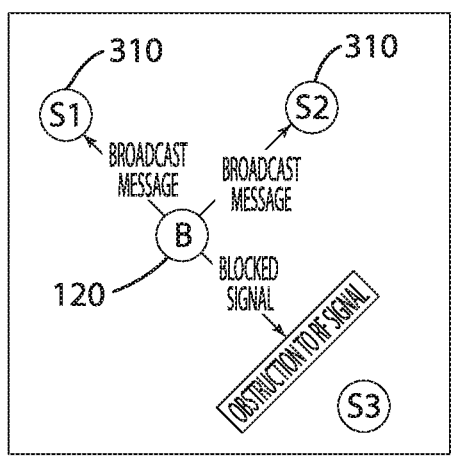 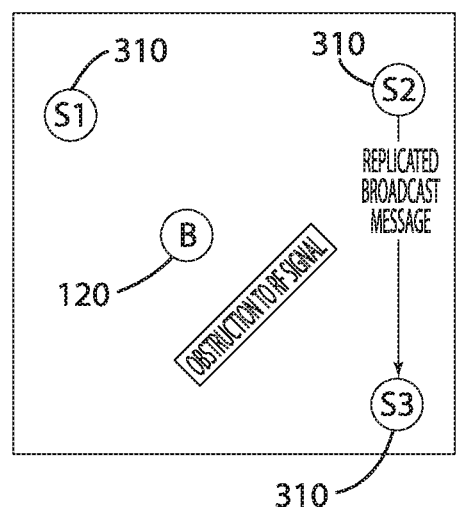
Fig. 11A            Fig. 11B

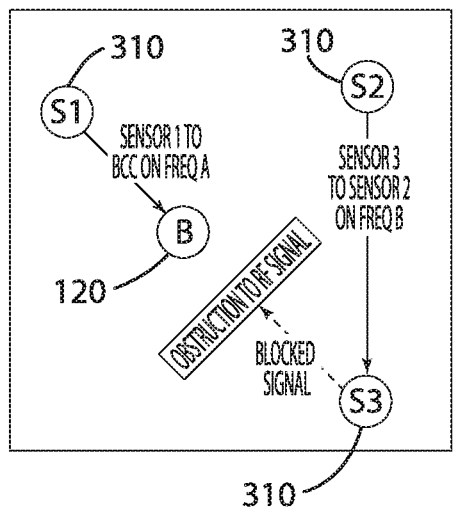
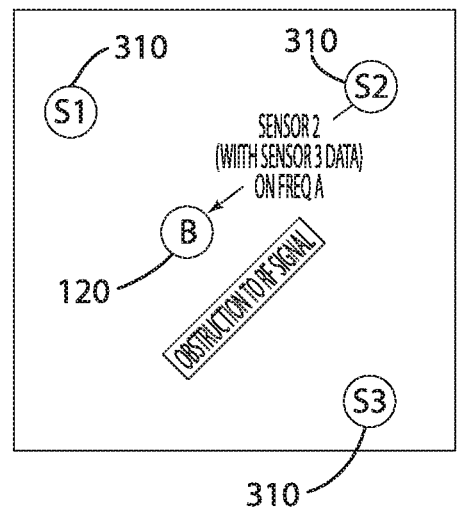
Fig. 11C    Fig. 11D
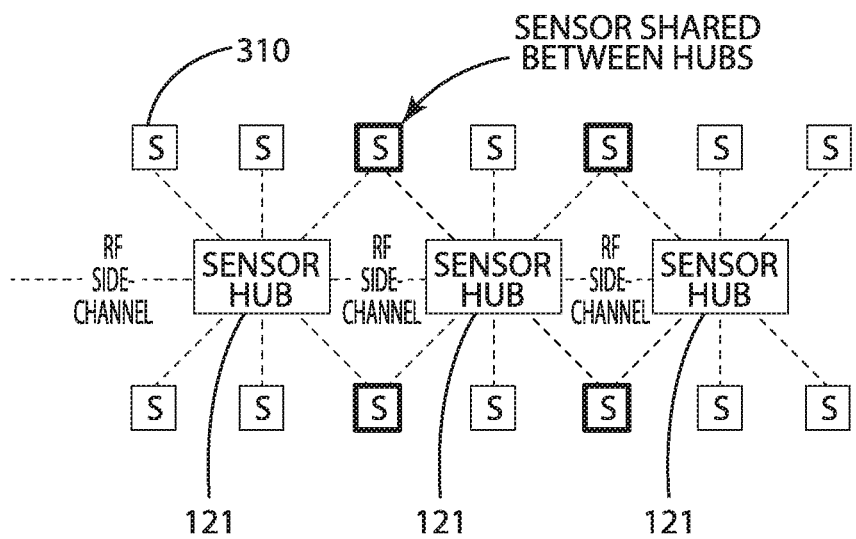
Fig. 12

SYSTEM AND METHOD FOR MICROLOCATION SENSOR COMMUNICATION

TECHNICAL FIELD

The present disclosure is directed to a system and method of communicating sensor information from a plurality of sensors to a controller, and more particularly to communicating sensor information pertaining to communications between a portable device and the controller.

BACKGROUND

Significant efforts have been made toward enabling the utilization of smartphones as keys to access or command the operation of an equipment device, such as a door or a vehicle. Conventional systems may rely on signal strength of communications to determine relative distance and/or position between a transmitter and a receiver. For instance, many conventional systems measure signal strength with a directional antenna to determine the relative distance and/or position between a transmitter and a receiver. If multiple measurements are made with respect to multiple communications between the transmitter and the receiver, a significant number of measurements can be generated. Due to bandwidth constraints, this number can be limited, adversely affecting the ability of a system to measure and determine location with respect to the transmitter and the receiver.

SUMMARY OF THE DESCRIPTION

A system and a method in accordance with one or more embodiments may facilitate wirelessly synchronizing, monitoring, or communicating, or a combination thereof, among one or more sensors (e.g., sensors, hubs, sensor controllers, etc.). The system and method in one embodiment may be based on a Bluetooth Low Energy (BLE) microlocation system. The system or method, or both, may use the BLE hardware (e.g., transmitters, receivers, antennas, etc.) to interleave a communications protocol within connection interval gaps of the BLE protocol used to communicate with devices.

A method of collecting sensor information with respect to communications between a controller device and a portable device is provided in one embodiment. The method may include transmitting one or more connection parameters pertaining to a communication link between the controller device and the portable device in accordance with a communication protocol, and receiving the one or more connection parameters in at least one sensor device. The method may involve repeatedly communicating, at a connection interval, data via the communication link between the controller device and the portable device. The at least one sensor device may sense one or more characteristics of communications between the controller device and the portable device during the connection interval. The sensor information pertaining to the one or more sensed characteristics may be transmitted in a gap time frame within the connection interval.

In one embodiment, the gap time frame may be defined between a) an end of communications between the master device and the portable device during the connection interval and b) a start of a subsequent connection interval. In one embodiment, the method may include broadcasting the one or more connection parameters to the at least one sensor.

In one embodiment, the communication protocol is Bluetooth Low Energy, and the transmission of sensor information is conducted via Bluetooth Low Energy hardware but not in accordance with the Bluetooth Low Energy protocol.

A system for communicating sensor information is provided in one embodiment. The system may include a controller device, and a plurality of sensor devices. The controller device may be configured to communicate with the plurality of sensor devices, and to receive a plurality of packets from a first set of the plurality of sensor devices.

Each of the plurality of sensor devices may be configured to obtain a sensed characteristic, optionally with respect to communications with (e.g., to and/or from) a portable device. Each of the plurality of sensor devices may be configured to generate a data packet with sensor information indicative of the sensed characteristic, and to transmit the data packet to at least one of the controller device and another of the plurality of sensor devices. In one embodiment, the data packet may be transmitted to all of the plurality of sensor devices on a communication channel or frequency different from the one being utilized by another sensor device to communicate its data packet to the controller device.

Each of the plurality of sensor devices may be configured to obtain the sensed characteristic by at least one of sensing the sensed characteristic and receiving the sensed characteristic from another of the plurality of sensor devices. To provide an example, a sensor device may receive the sensed characteristic wirelessly via communication, or by measuring or sensing a characteristic (e.g., wireless communications or an external parameter such as temperature).

In one embodiment, a first sensor device is included in the first set of the plurality of sensor devices, and a second sensor device is included in a second set of the plurality of devices. The first sensor device of the first set may be configured to transmit the data packet to the controller device during a first time frame in which the second sensor device transmits the data packet with sensor information. During a second time frame subsequent to the first time frame, the controller device receives the sensor information generated by the second sensor device.

As an example, the first sensor device may receive the sensor information generated and transmitted by the second sensor device during the first time frame, and then transmit the sensor information during the second time frame. This sensor information may include one or more measurements of the characteristic sensed by the second sensor device.

In one embodiment, communications with the controller device may be conducted in accordance with a communication protocol, wherein the plurality of sensor devices receive communications with respect to a portable device in accordance with a Bluetooth Low Energy communications protocol. The controller device may communicate connection parameters to the plurality of sensor devices for monitoring communications with the portable device. The connection parameters may include information facilitating receipt of communications from the portable device during a plurality of connection intervals. During each of the plurality of connection intervals, the portable device may communicate data via a communication link with the controller device in accordance with the Bluetooth low energy protocol. Each of the plurality of sensors may include Bluetooth low energy hardware capable of receiving communications transmitted via the communication link.

The first and second time frames during which sensor information is transmitted from the plurality of sensors may be defined within a gap time frame of each connection interval. During this gap time frame, communications from the portable device may be absent.

In one embodiment, communications from the first sensor device and the second sensor device may be defined according to a communication protocol different from the Bluetooth low energy protocol but communicated via the Bluetooth low energy hardware.

A system for collecting sensor information may be provided in one embodiment. The system may include a plurality of sensor devices and a communication controller. The plurality of sensor devices may be configured to communicate sensor information, to obtain a sensed characteristic, and to generate sensor information indicative of the sensed characteristic. The sensed characteristic may be obtained by at least one of sensing the sensed characteristic and receiving the sensed characteristic from another of the plurality of the sensor devices.

The communication controller may be configured to collect sensor information from the plurality of sensor devices, where a first sensor device of the plurality of sensor devices is configured to collect sensor information from a second sensor device of the plurality of sensor devices. The first sensor device may receive sensor information from the second sensor device during a time frame in which a third sensor device (which may optionally be the first sensor device) of the plurality of sensor devices transmits sensor information to the communication controller. The first sensor device may generate an aggregate data packet with sensor information received from the second sensor device, and may transmit the aggregate data packet to the communication controller.

A method of communicating sensor information from a plurality of sensor devices to a controller device is provided in one embodiment. The method may include obtaining a sensed characteristic in each of a first sensor device and a second sensor device, and generating sensor information indicative of the sensed characteristic obtained in each of the first sensor device and the second sensor device. During a first time frame, the sensor information from the first sensor device may be transmitted to the controller device. During this first time frame, the sensor information from the second sensor device may be transmitted. During a second time frame subsequent to the first time frame, a sensor device other than the second sensor device may transmit the sensor information obtained in the second sensor device.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWINGS

FIG. 10 shows replicated broadcast and relayed sensor timing in accordance with one embodiment.

FIGS. 11A-D show replicated broadcast and relayed sensor sequencing in accordance with one embodiment.

FIG. 12 shows a sensor shared between sensor hubs in accordance with one embodiment.

DESCRIPTION

A. System Overview

Figure 1:
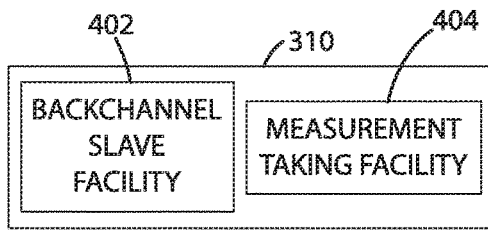
FIG. 1 shows a sensor with internal functionality in accordance with one embodiment.
Figure 2:
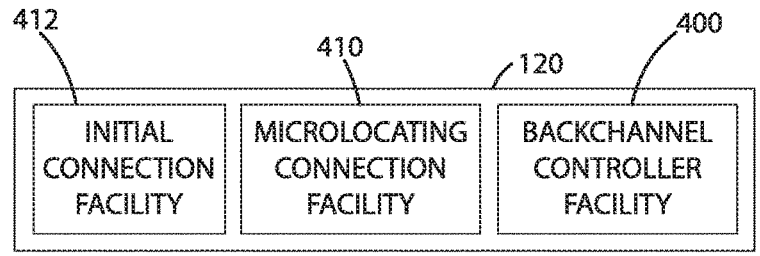
FIG. 2 shows a backchannel controller with internal functionality in accordance with one embodiment.
Figure 3:
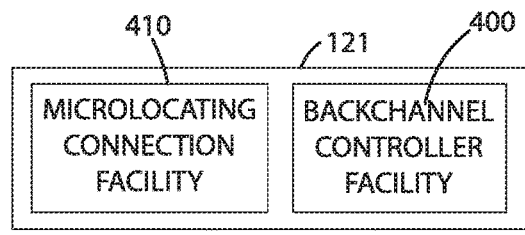
FIG. 3 shows a sensor hub with internal functionality in accordance with one embodiment.

The present disclosure is directed to a system and a method to wirelessly synchronize, monitor, or communicate, or a combination thereof, amongst sensors (e.g., sensors, hubs, sensor controllers, etc.) in a Bluetooth Low Energy (BLE)-based microlocation system. The system or method, or both, may use the BLE hardware (e.g., transmitters, receivers, antennas, etc.) to interleave a communications protocol (a "wireless back-channel") within the connection interval gaps of the standard BLE protocol used to communicate with devices. The general method of communication described in this disclosure may utilize broadcast messages to one or more sensors, with sensor replies being scheduled and sent via a logical cascading tree topology.

To enhance or maximize microlocation accuracy, it is useful to collect and analyze sensor measurements quickly, and in a synchronized manner, so as to reduce or minimize errors and substantially detect failures/anomalies. Besides facilitating the monitoring (communication and collection) of microlocation sensor data, the system and method may provide additional measurement information about the environment in which the sensors reside, independent of microlocated devices, that may further assist microlocation systems and methods by providing significantly more data, with greater diversity, than conventional methods. The system and method may also be used for distributing time related data for synchronizing sensor operations. Additionally, the system may be used for communicating setup, configuration, control, diagnostic, operational, or other information, or any combination thereof.

It may be worth noting that, while the described system and methods are applied to BLE-based microlocation systems, they may also be applied to microlocation systems using alternate radio frequency and non-radio frequency wireless (e.g., Ultra-Wideband [UWB], ultrasonic sound, optics [e.g., light], and so on) and wired (e.g., UART, LIN, CAN, Ethernet, and so on) technologies and/or protocols. It may also be applied to systems that are not microlocation systems, such as to enable synchronization, monitoring, or communications, or a combination thereof, between components (e.g., a non-microlocating system, wherein components communicate using BLE hardware as described herein, a system using UWB, etc.).

A.1. Microlocation System

One or more aspects of the system may be implemented in conjunction with one or more aspects of the microlocation system(s) described in U.S. Nonprovisional patent application Ser. No. 15/488,136 to Raymond Michael Stitt et al., entitled SYSTEM AND METHOD FOR ESTABLISHING REAL-TIME LOCATION, filed Apr. 14, 2017 and U.S. Provisional Appl. No. 62/323,262 to Raymond Michael Stitt, filed Apr. 15, 2016, and entitled SYSTEM AND METHOD FOR ESTABLISHING REAL-TIME LOCATION—the disclosures of which are incorporated by reference herein in their entirety—where therein monitor or master devices are referred to as sensors herein, and therein, portable devices are referred to as devices herein ("portable devices" may be portable or fixed-position, despite the terminology therein). In such an embodiment, where the microlocation system uses BLE to communicate with devices, and sensors utilize the described system and method herein to synchronize, monitor, or communicate, or a combination thereof, with one another, sensors and devices may utilize only BLE hardware to communicate.

One or more aspects of the system may be implemented in conjunction with one or more aspects of the security model described in U.S. Provisional Patent Application No. 62/413,966, entitled SYSTEM AND METHOD FOR AUTHENTICATING AND AUTHORIZING DEVICES AND/OR FOR DISTRIBUTING KEYS, filed Oct. 27, 2016, to Smith et al. and U.S. patent application Ser. No. 15/796,180, entitled SYSTEM AND METHOD FOR AUTHENTICATING AND AUTHORIZING DEVICES, filed Oct. 27, 2017, to Smith et al.—the disclosures of which are incorporated herein by reference in their entirety—where therein SCMs may be referred to herein as sensor (backchannel) hubs and/or sensor (backchannel) controllers. In such an embodiment, for example, to facilitate secure communication amongst sensors, sensor keys (symmetric and/or asymmetric) and/or certificates and/or other security-related configuration and/or credentials may be securely obtained, updated (cycled), and/or revoked using any of the therein-described methods (e.g., via the ACP or another configuration package).

A system in accordance with one embodiment of the present disclosure incorporating a microlocation system is shown and described in connection with FIGS. 16-18 and designated 100.

The system 100 may include one or more of the following system components: a) one or more users 10 (e.g., people); b) one or more devices 110, such as portable devices (e.g., smartphones, cards or fobs, or a combination thereof) and/or fixed devices (e.g., computers/servers, or wall-mounted panels/displays, or a combination thereof; c) one or more system control modules (SCM) 120, also described as hardware or a master device or a hub or a sensor controller; d) one or more sensors 310; and e) one or more equipment components 140, which may be configured for controlling equipment operations, activating services thereon, relaying information to another aspect of the system 100, or retrieving information from another aspect of the system 100, or a combination thereof.

The system 100 may allow the one or more users 10 to interact with or access the equipment 140 using the device 110. The device 110 may communicate with the equipment 140 (such as a vehicle, a lock, or a table) by communicating with the SCM 120. The SCM 120 in one embodiment may authenticate the device 110, provide or receive configuration data, authorize actions (e.g., to connect or to send and/or receive a request, a command, an update, or a response, or a combination thereof), or communicate with the equipment component 140 to achieve a desired action, or a combination thereof. The device 110 may communicate with a cloud (not shown) to obtain, change, or distribute, or a combination thereof, authorizations (described herein), and other configuration data, amongst relevant devices and users. An example of such a system is shown and described in U.S. patent application Ser. No. 15/796,180 to Smith et al., filed Oct. 27, 2017, entitled SYSTEM AND METHOD FOR AUTHENTICATING AND AUTHORIZING DEVICES— the disclosure of which is hereby incorporated by reference in its entirety.

A.1.a. Communications and Interaction Overview

Figure 16:
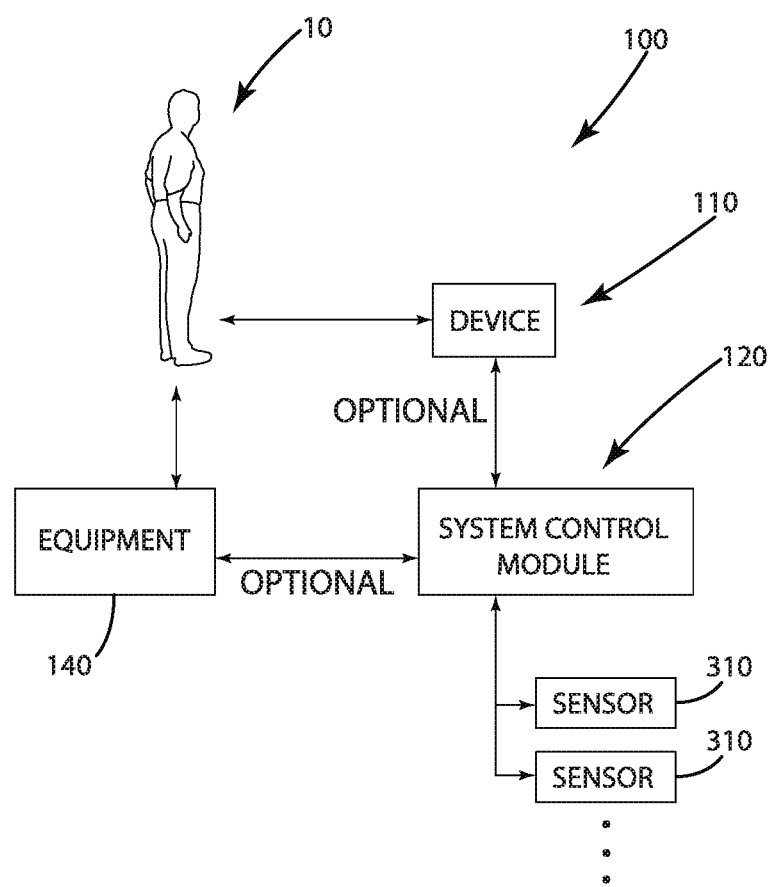
FIG. 16 shows a system in accordance with one embodiment.
Figure 17:
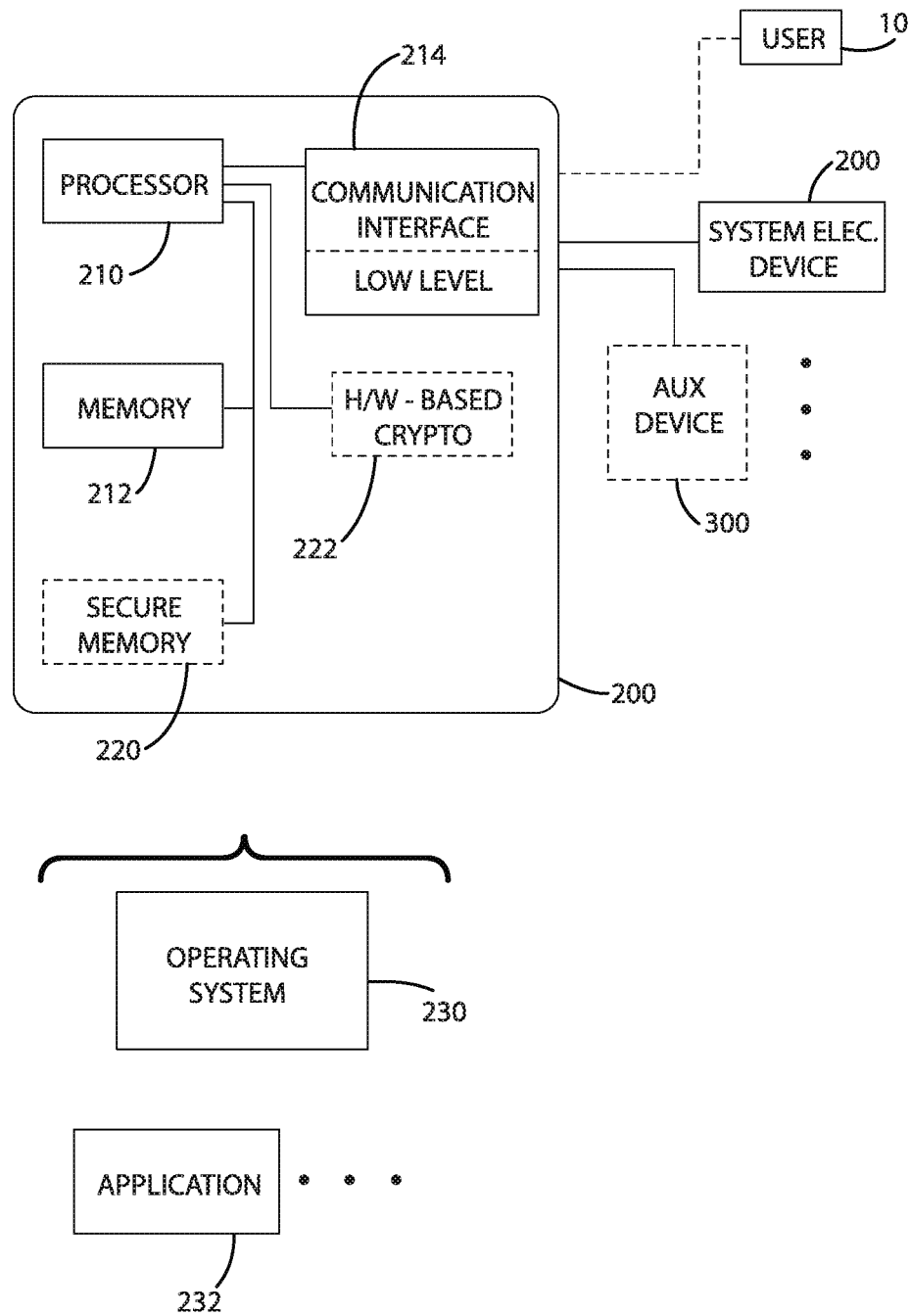
FIG. 17 shows a device in accordance with one embodiment.
Figure 18:
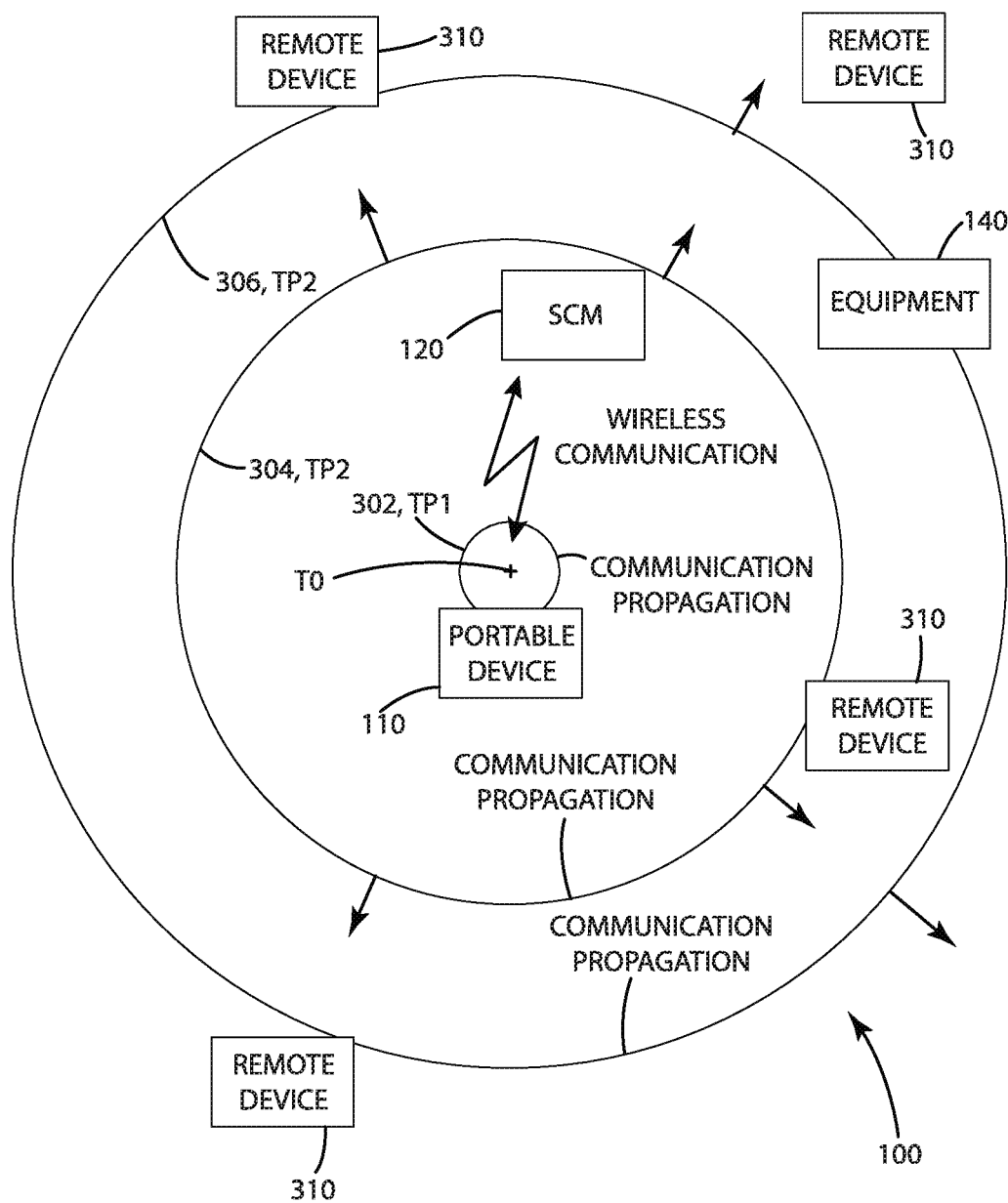
FIG. 18 shows the system of FIG. 16 in accordance with one embodiment.

The communication links between the one or more system components depicted in the illustrated embodiments of FIGS. 16-18 may be wireless or wired, or both. One system component, such as the device 110, may be local or remote relative to another system component, such the SCM 120. The system 100 may include any number of each system component, including embodiments in which the number is zero such as where no equipment is present.

In one embodiment, the roles of a system component in the system 100 are not necessarily fixed as one type of component. For instance, a system component may change roles dynamically during operation, or a system component may take on the role of two or more components of the system 100. For instance, the SCM 120 may be the equipment component 140 for another SCM 120. In a more specific form of this example, the SCM 120 may be the equipment component 140 communicating with the other SCM 120. For purposes of disclosure, the remaining discussion focuses upon a system 100 wherein the one or more equipment components 140 exist—although it should be understood that one or more of these system components may be absent. Optionally, the system 100 may be configured to communicate with another system, such as a cloud system of devices.

A.1.b. Component Overview

The system 100 in the illustrated embodiment may include one or more system components as outlined herein. A system component may be a user or an electronic system component, which may be the device 110, the SCM 120, the equipment component 140, or the cloud, or a combination thereof. The electronic system component, as discussed herein, may be configured to operate as any one or more of these devices. In this sense, in one embodiment, there may be several aspects or features common among the device 110, the SCM 120, the equipment component 140, and the cloud. For purposes of disclosure, these features are described in connection with the electronic component depicted in FIG. 17 and generally designated 200.

The electronic system component 200 (e.g., all system components, except users) may include one or more processors 210 that execute one or more applications 232 (software and/or includes firmware), one or more memory units 212 (e.g., RAM and/or ROM), and one or more communications units 214, amongst other electronic hardware. The electronic system component 200 may or may not have an operating system 230 that controls access to lower-level devices/electronics via a communication unit 214. The electronic system component 200 may or may not have hardware-based cryptography units 222—in their absence, cryptographic functions may be performed in software. The electronic system component 200 may or may not have (or have access to) secure memory units 220 (e.g., a secure element or a hardware security module (HSM)). Optional components and communication paths are shown in phantom lines in the illustrated embodiment.

The system 100 in the illustrated embodiment is not dependent upon the presence of a secure memory unit 220 in any component. In the optional absence of a secure memory unit 220, data that may be stored in the secure memory unit 220 (e.g., private and/or secret keys) may be encrypted at rest (when possible). Both software-based and hardware-based mitigations may be utilized to substantially prevent access to such data, as well as substantially prevent or detect, or both, overall system component compromise. Examples of such mitigation features include implementing physical obstructions or shields, disabling JTAG and other ports, hardening software interfaces to eliminate attack vectors, using trusted execution environments (e.g., hardware or software, or both), and detecting operating system root access or compromise.

For purposes of disclosure, being secure is generally considered being confidential (encrypted), authenticated, and integrity-verified. It should be understood, however, that the present disclosure is not so limited, and that the term "secure" may be a subset of these aspects or may include additional aspects related to data security.

The communication interface 214 may be any type of communication link, including any of the types of communication links describe herein, including wired or wireless. The communication interface 214 may facilitate external or internal, or both, communications. For instance, the communication interface 214 may be coupled to or incorporate an antenna 312.

As another example, the communication interface 214 may provide a wireless communication link with another system electronic device 200 in the form of the device 110, such as wireless communications according to the Bluetooth LE standard, or the cloud 130 via WiFi Ethernet communication link. In another example, the communication interface 214 may be configured to communicate with the equipment component 140 (e.g., a vehicle component) via a wired link such as a CAN-based wired network that facilitates communication between a plurality of devices. The communications interface 214 in one embodiment may include a display and/or input interface for communicating information to and/or receiving information from the user 10.

In one embodiment, shown in FIG. 17, the electronic system component 200 may be configured to communicate with one or more auxiliary devices 300 other than another electronic system component 200 or a user. The auxiliary device 300 may be configured differently from the electronic system component 200—e.g., the auxiliary device 300 may not include a processor 210, and instead, may include at least one direct connection and/or a communication interface for transmission or receipt, or both, of information with the electronic system component 200. For instance, the auxiliary device 300 may be a solenoid that accepts an input from the electronic system component 200, or the auxiliary device 300 may be a sensor (e.g., a proximity sensor) that provides analog and/or digital feedback to the electronic system component 200.

A.1.c. Micro-Location

The system 100 in the illustrated embodiment may be configured to determine location information in real-time with respect to the device 110. In the illustrated embodiment of FIG. 16, the user 10 may carry the device 110 (e.g., a smartphone). The system 100 may facilitate locating the device 110 with respect to the equipment 140 (e.g., a vehicle) in real-time with sufficient precision to determine whether the user is located at a position at which access to the equipment or permission for an equipment command should be granted.

For instance, in the realm of vehicles where the equipment 140 is a vehicle, the system 100 may facilitate determining whether the device 110 is outside the vehicle but in close proximity, such as within 5 feet, 3 feet, or 2 feet or less, to the driver-side door. This determination may form the basis for identifying whether the system 100 should unlock the vehicle. On the other hand, if the system 100 determines the device 110 is outside the vehicle and not in close proximity to the driver-side door (e.g., outside the range of 2 feet, 3 feet, or 5 feet), the system 100 may determine to lock the driver-side door. As another example, if the system 100 determines the device 110 is in close proximity to the driver-side seat but not in proximity to the passenger seat or the rear seat, the system 100 may determine to enable mobilization of the vehicle. Conversely, if the device 110 is determined to be outside close proximity to the driver-side seat, the system 100 may determine to immobilize or maintain immobilization of the vehicle.

The vehicle in this context may also include other types of equipment 140, such as one or more sensors 310 described in connection with the illustrated embodiment of FIG. 18. The one or more sensors 310 may be constructed in a manner similar to an embodiment described in connection with the electronic system component 200.

Micro-location of the equipment 140 may be determined in a variety of ways, such as using information obtained from a global positioning system, one or more signal characteristics of communications from a device 110, and one or more sensors (e.g., a proximity sensor, a limit switch, or a visual sensor), or a combination thereof. An example of microlocation techniques for which the system 100 can be configured are disclosed in U.S. Nonprovisional patent application Ser. No. 15/488,136 to Raymond Michael Stitt et al., entitled SYSTEM AND METHOD FOR ESTABLISHING REAL-TIME LOCATION, filed Apr. 14, 2017—the disclosure of which is hereby incorporated by reference in its entirety.

In one embodiment, in the illustrated embodiment of FIG. 18, the SCM 120 and a plurality of sensors 310 may be disposed on or in a fixed position relative to the equipment component 140. Example use cases of the equipment component 140 include the vehicle identified in the prior example, or a building for which access is controlled by the equipment component 140. The sensors 310 in the illustrated embodiment may include one or more antennas 312 as described herein. The arrangement or position of the sensors 310 may be in accordance with one or more embodiments described herein. Signal processing of the SCM 120 may be in accordance with one or more embodiments described herein.

The device 110 may communicate wirelessly (e.g., via Bluetooth LE) with the SCM 120 via a communication link. The plurality of sensors 310 may be configured to sniff the communications between the device 110 and the SCM 120 to determine one or more signal characteristics of the communications, such as signal strength. The determined signal characteristics may be communicated or analyzed and then communicated to the SCM 120 via a communication link separate from the communication link between the device 110 and the SCM 120. Additionally, or alternatively, the device 110 may establish a direct communication link with one or more of the sensors 310, and the one or more signal characteristics may be determined based on this direct communication link.

As an example, as shown in the illustrated embodiment, the propagation waves of communications from the device 110 to the SCM 120 are shown and designated 302, 304, 306. The greater the distance from the device 110 (the source), the lesser the strength of the wireless communications. The strength of the communications about the propagation wave 306 is less than the strength of the propagation wave 302. Further, in the case of a communication being transmitted at time t0, the travel time (tp1-t0) for the communication at the propagation wave 302 is less than the travel time (tp3-t0) for the communication at propagation wave 306. As a result, if a sensor 310 receives the communication at the propagation wave 302, the time stamp for arrival of the communication may be earlier than if the communication were received at the propagation wave 306.

As described herein, one or more signal characteristics, such as signal strength and time of arrival, may be analyzed to determine location information about the device 110 relative to the SCM 120. For instance, time difference of arrival among the sensors 310 and the SCM 120 may be processed to determine a relative position of the device 110. The positions of the one or more sensors 310 relative to the SCM 120 may be known so that the relative position of the device 110 can be translated to an absolute position with respect to the sensors 310 and the SCM 120. Additional or alternative examples of signal characteristics may be obtained to facilitate determining position according to one or more algorithms, including a distance function, trilateration function, a triangulation function, a multilateration function, a fingerprinting function, a differential function, a time of flight function, a time of arrival function, a time difference of arrival function, an angle of arrival function, an angle of departure function, a geometric function, etc., or any combination thereof.

It should be noted that for purposes of illustration, the propagation waves 302, 304, 306 are depicted as uniformly circular—however, the propagation waves may vary in shape depending on other factors such as interference or use of a directional antenna.

In one embodiment, information relating to the communications between the device 110 and the SCM 120 may be provided to the plurality of sensors 310. For instance, connection parameters relating to a Bluetooth LE channel may be provided to the sensors 310 so that the plurality of sensors 310 can monitor the communications. For instance, the communication channel may vary one or more parameters during communications, such as the frequency of transmissions from packet to packet or among bits transmitted in the packet. These one or more variable parameters may be communicated to the sensors 310 to enable receipt of packets or communications.

A.2. System Components

The system 100, also described as a backchannel system, in accordance with one embodiment may include of one or more backchannel controllers (BCC, 120), one or more sensor hubs 121, one or more sensors 310, and one or more devices 110. The BCC 120 in the illustrated embodiments of FIGS. 1-15 is designated 120, are also described as an SCM or master device herein. The one or more sensor hubs 121 may be similar to the BCC 120 but with the exception of being configured without an Initial Connection Facility (described herein) and are designated 121 in the illustrated embodiments of FIGS. 1-15. The one or more Sensors 310 in the illustrated embodiments of FIGS. 1-15 may correspond to the sensor 310 described in connection with FIGS. 16-18 and are designated 310 as well. And, the one or more devices in the illustrated embodiments of FIGS. 1-15 may correspond to the device 110 described in connection with FIGS. 16-18 and are designated 110, too.

A.2.a. Device

In one embodiment, a device 110 is an item in the system 100 that may be microlocated. In some instances, the device 110 may be mobile (portable), whereas in others, it may be fixed; the remainder of the system 100 may or may not be moving. A sensor 310, sensor hub 121, or backchannel controller 120, or a combination thereof, may also be a device 110 (e.g., in the event that a Sensor 310, sensor hub 121, or backchannel controller 120, or a combination thereof, is being microlocated during an automatic calibration procedure during the manufacturing process). In some cases, the device 110 may correspond to the location of a person; in other cases, it may be a vehicle, animal, or other item. In some systems, the device 110 can be a mobile phone, a tablet, or other electronic component with BLE hardware. In other systems, the device 110 may be an electronic component with UWB hardware. The location of a device 110 may be calculated by measuring attributes of messages received from said device 110.

A.2.b. Sensor

In one embodiment, sensors 310 may perform measurements that may correlate to the location of one or more devices 110. Sensors 310 may be strategically located to support microlocation. Sensors 310 may measure or derive any number of attributes via received messages, including, but not limited to, received signal strength indicator (RSSI), angle-of-arrival (AoA), or time-of-flight, or a combination thereof. Sensors 310 may also forward information obtained from devices 110, itself, other sensors 310, sensor hubs 121, or backchannel controllers, or a combination thereof.

A Facility may be a collection of software and/or hardware that performs a particular function; facilities may be described as generically or specifically to illustrate a particular function (e.g., BLE communications, the BLE software stack, the BLE central mode controller, the BLE radio, etc.). The sensor 310 may include at least one Measurement Taking Facility (MTF, 404) and at least one Backchannel Slave Facility (BCSF, 402), amongst other possible facilities (as described below). See e.g., the illustrated embodiment of FIG. 1.

In one embodiment, each sensor 310 may have multiple antennas, where the desired antenna is selected before each packet is sent or received. This embodiment may be implemented in conjunction with one or more embodiments described in U.S. Provisional Appl. No. 62/434,392 to Smith et al., filed Dec. 14, 2016, and entitled METHOD AND SYSTEM FOR ESTABLISHING MICROLOCATION ZONES and U.S. Nonprovisional application Ser. No. 15/842,479 to Smith et al., filed Dec. 14, 2017, and entitled METHOD AND SYSTEM FOR ESTABLISHING MICROLOCATION ZONES—the disclosures of which are incorporated by reference herein in their entirety.

The BCSF 402 provides the Backchannel Protocol (BCP, described herein) on appropriate communications medium(s).

A.2.c. Backchannel Controller

A backchannel controller (BCC, 120) may include at least one Initial Connection Facility (ICF, 412), at least one Microlocating Connection Facility (MCF, 410), or at least one Backchannel Controller Facility (BCCF, 400), or any combination thereof. See e.g., the illustrated embodiment of FIG. 2.

The Initial Connection Facility (ICF 412) may be used to establish the "Initial Connection" between the device 110 and BCC 120 (i.e., the ICF 412). With such a microlocation system using BLE, the ICF 412 may establish the "Initial Connection" when the device 110 is operating in the "Central" role (and thus, the ICF 412 is operating in the "Peripheral" role) or, alternatively, when the device 110 is operating in the "Peripheral" role (and thus, the ICF 412 is operating in the "Central" role). Measurements may be taken from devices 110 connected to the ICF 412. An embodiment of the present disclosure may be implemented in conjunction with one or more embodiments described in U.S. Provisional Appl. No. 62/323,262 to Raymond Michael Stitt, filed Apr. 15, 2016, and entitled SYSTEM AND METHOD FOR ESTABLISHING REAL-TIME LOCATION—the disclosure of which is incorporated by reference herein in its entirety.

In one embodiment, only the MCF 410 may be present. Such an embodiment may be implemented in conjunction with one or more embodiments the system described in U.S. Nonprovisional application Ser. No. 14/620,959 to J. Michael Ellis et al., filed Feb. 12, 2015, and entitled SYSTEM AND METHOD FOR COMMUNICATING WITH A VEHICLE—the disclosure of which is incorporated herein by reference in its entirety.

The Microlocation Connection Facility (MCF 410) may be used to establish and maintain the "Microlocating Connection" (or, in the absence of the ICF 412, the connection) between the device 110 and BCC 120 (i.e., the MCF 410). With such a microlocation system using BLE, the MCF 410 may establish the "Microlocating Connection" when the device 110 is operating in the "Peripheral" role (and thus, the MCF 410 is operating in the "Central" role) or, alternatively, when the device 110 is operating in the "Central" role (and thus, the MCF 410 is operating in the "Peripheral" role). Measurements may be taken from devices 110 connected to the MCF 410. One embodiment in accordance with the present disclosure may be implemented in conjunction with one or more embodiments described in U.S. Provisional Appl. No. 62/323,262 to Raymond Michael Stitt, filed Apr. 15, 2016, and entitled SYSTEM AND METHOD FOR ESTABLISHING REAL-TIME LOCATION—the disclosure of which is incorporated herein by reference in its entirety.

In one embodiment, the ICF 412 and MCF 410 may establish secure connections.

For specific applications, other facilities may exist in the backchannel controller 120. For example, to determine device 110 location based on measured data, a Location Determining Facility (LDF) may exist in the backchannel controller 120. As another example, the backchannel controller 120 may provide a Sensor Network Environment Measuring Facility (SNEMF). In yet another example, the backchannel controller 120 may incorporate an interface to external equipment.

The BCCF 400 may be a superset of and/or contain the BCSF 402. The BCCF 400 may orchestrate the BCP amongst BCSFs 402 (described later) on appropriate communications medium(s).

A.2.d. Sensor Hub

A sensor hub 121 may include at least one Microlocating Connection Facility (MCF 410) and/or at least one backchannel controller 120 (no Initial Connection Facility [ICF 412]). See e.g., the illustrated embodiment of FIG. 3. One or more sensor hubs 121 may be used in situations where Sensors 310 are distributed and where a relay or aggregator of Sensor 310 communications may be used to overcome large distances between or among the sensors.

A.3. Backchannel Protocol (BCP)

The Backchannel Protocol (BCP) defines the system 100 and method by which BCSFs 402 and BCCFs 400 may communicate with one another.

Figure 4:
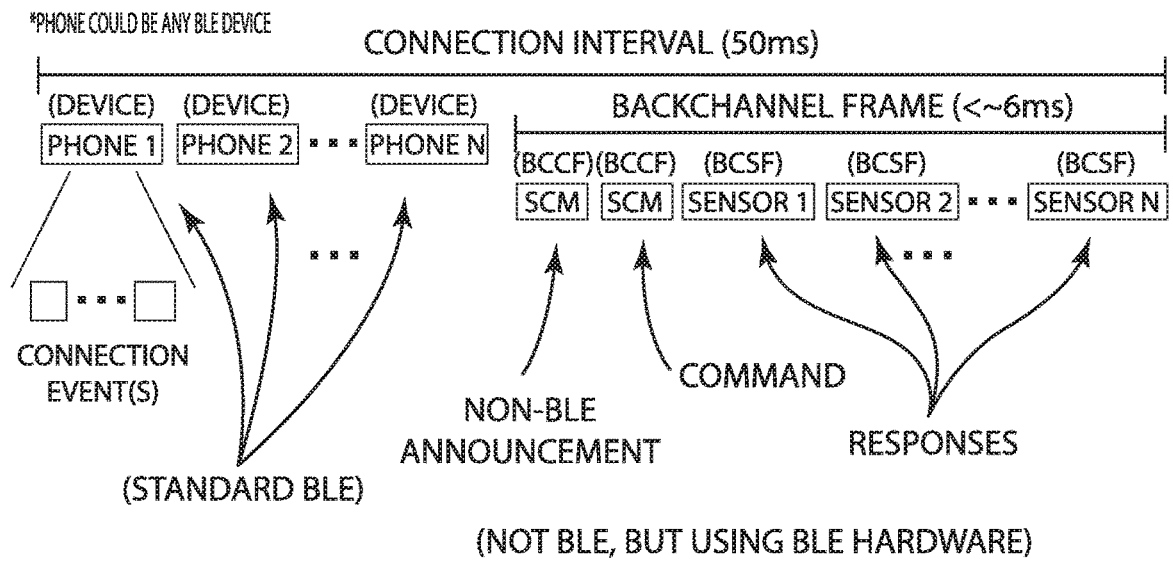
FIG. 4 shows a backchannel protocol frame in accordance with one embodiment.

In a BLE-based microlocation system 100, the BCP may be interleaved within the connection interval gaps of the standard BLE protocol used to communicate with devices 110 (e.g., MTF 404, ICF 412, MCF 410, other facilities, etc.), for example, as shown in the illustrated embodiment of FIG. 4. In non-BLE-based and/or mixed technology systems, the BCP may be interleaved, switched/multiplexed, or used simultaneously amongst other communications protocols, or any combination thereof.

The BCP Frame (Backchannel [Protocol] Frame) may bound the timing of the BCP (as contained within another protocol or on its own) and may contain a set of one or more announcements, Commands, or Responses, or any combination thereof, as described in subsequent sections.

In a BLE-based embodiment, the BCP Frame bounds the timing of the BCP within the BLE protocol (as described elsewhere). In this BLE-based embodiment, there is up to one BCP Frame per connection interval. In an alternate of the BLE-based embodiment, there may be one or more BCP Frames per connection interval.

In a BLE-based embodiment, the BCP Frame may be dynamically positioned within the connection interval after the connection events for devices 110, such that the BCP does not conflict substantially with devices 110, or their addition and/or removal, within the system 100. In an alternate BLE-based embodiment, the BCP Frame may be positioned at the end of the connection interval, such that devices 110, or their addition and/or removal within the system 100, does not substantially impact BCP timing. In an alternate BLE-based embodiment, the BCP Frame may span the entire BLE connection interval, with BCP communications occurring within the various gaps before, between, or after device 110 connection events.

A.3.a. Connecting and Reconnecting to the Sensor Network

BCSFs 402 may join sensor networks established by BCCFs 400 (as described in Section A.5.b).

At BCCF 400 power-on, reset, loss of BCSF 402 communication (as described below), or any other event, or a combination thereof, that may trigger such an action (e.g., self-test failure, command, etc.), the BCCF 400 may establish BCP configuration parameters (e.g., initial channel, frequency, etc.) and send an Announcement Packet (as described below).

At BCSF 402 power-on, reset, loss of BCCF 400 communication (as described below), or any other event, or a combination thereof, that may trigger such an action (e.g., self-test failure, command, etc.), the BCSF 402 may wait and listen for the Announcement Packet (i.e., enters the unknown-BCP-configuration state, as described below) to obtain configuration parameters.

An alternate embodiment, wherein the configuration parameters are fixed and known by all or a subset of system components, and thus, the Announcement Packet may not be present.

A.3.a.1 Announcement Packet

The Announcement Packet may contain configuration parameters (including protocol version information and/or other attributes), as well as non-configuration parameters, used within the BCP. The Announcement Packet may also contain no parameters, wherein it may be used as a heartbeat or synchronization mechanism. In a BLE-based embodiment, the Announcement Packet may contain the current BLE channel on which BCSFs 402 should communicate. In a BLE-based embodiment, the Announcement Packet may contain the BLE channel on which the next Announcement Packet will be sent.

A.3.a.1.a Announcement Packet—BCCF

The Announcement Packet may broadcast to the network (i.e., to BCSFs 402 from a BCCF 400) at the start of each BCP Frame. Note that BCCFs 400 may include the BCSF 402, and thus, other BCCFs 400 may be recipients of the Announcement Packet. If applicable to the communications medium, the BCCF 400 may not have previously provided an Announcement Packet to BCSFs 402 that may allow them to determine the current and/or next broadcast frequency/channel (e.g., because it was just powered-on, was reset, has determined it is no longer communicating with BCSFs 402, or because of any other event that may have caused it to stop broadcasting on the previously communicated frequency/channel [e.g., self-test failure, command, etc.], or a combination of reasons thereof). When in this state (the synchronize-configuration state), the BCCF 400 may establish new configuration parameters (that may not be congruent with any previously established configuration parameters, if applicable) and may additionally wait for all or a subset of known BCSFs 402 to communicate (i.e., send Response packets), with or without a timeout. If applicable to the communications medium, the BCCF 400 may broadcast the Announcement Packet on a particular frequency/channel, set of frequencies/channels, or all or a subset of frequencies/channels; the frequency/channel on which to broadcast may be fixed or selected using a predetermined sequence, randomized sequence, network congestion, or any other method, or combination of methods, as appropriate. The Announcement Packet may be sent on the same frequency/channel multiple times, within the same BCP Frame or amongst multiple BCP Frames (e.g., to mitigate network collisions, enable BCSFs 402 that may currently be listening on a different frequency/channel to change frequency/channel, etc.), or a combination thereof.

In a BLE-based embodiment, the Announcement Packet may be broadcast on one of the three advertising channels, wherein the advertising channel on which the Announcement Packet is sent may be selected in round-robin fashion from BCP Frame to BCP Frame (e.g., Frame 0 broadcasts on the first advertising channel [37], Frame 1 broadcasts on the second [38], Frame 2 broadcasts on the third [39], Frame 3 on the first [37], and so on); in this embodiment, BCSFs 402 listen for the Announcement Packet on the same BLE channel for multiple BCP Frames, and therefore, no specific behavior may be considered necessary from the BCCF 400 when in the synchronize-configuration state. It should be understood that specific behavior from the BCCF 400 may be required or optionally utilized when in the synchronize-configuration state in one embodiment. In an alternate BLE-based embodiment, the broadcast channel may also be selected based upon network congestion (e.g., computed background power, number of collisions detected, etc.), wherein such a round-robin selection algorithm may be altered in such a way that high-congestion channels are used less frequently (or not at all).

An alternate BLE-based embodiment, where when the BCCF 400 is in the synchronize-configuration state, the BCCF 400 may select and broadcast the Announcement Packet on one of the 40 BLE (data and/or advertising) channels, broadcasting on the same channel for each BCP Frame for an appropriate duration (e.g., a multiple of the total number of channels, a particular time duration, until Responses are received from all or a subset of known sensors, etc.), and wherein each BCSF 402 cycles through the set of possible channels until the Announcement Packet is obtained.

An alternate BLE-based embodiment, where when the BCCF 400 is in the synchronize-configuration state, the BCCF 400 may select and broadcast the Announcement Packet on a set of one or more of the 40 BLE (data and/or advertising) channels, selecting a new channel for each broadcast for each BCP Frame for an appropriate duration (e.g., a multiple of the size of the set, a particular time duration, until Responses are received from all or a subset of known sensors, etc.), and wherein each BCSF 402 listens on one channel of the set of possible channels until the Announcement Packet is obtained.

An alternate BLE-based embodiment, where when the BCCF 400 is in the synchronize-configuration state, the BCCF 400 may select and broadcast the Announcement Packet on a set of one or more of the 40 BLE (data and/or advertising) channels, selecting a new channel for each broadcast for each BCP Frame for an appropriate duration (e.g., a multiple of the size of the set, a particular time duration, until Responses are received from all or a subset of known sensors, etc.), and wherein each BCSF 402 cycles through the set of possible channels until the Announcement Packet is obtained.

A.3.a.1.b Announcement Packet—Loss and Omission

The communications medium may not be reliable, and thus, an Announcement Packet may not reach a particular BCSF 402. The Announcement Packet may be sent periodically by the BCCF 400 (e.g., at the start of every BCP Frame, once every N seconds or BCP Frames, etc.), and thus, it may be possible for each BCSF 402 to determine whether or not it has missed an expected Announcement Packet (e.g., via a counter, elapsed time since last receipt, etc.). If a BCSF 402 has determined that it has missed too many Announcement Packets (e.g., 3), it may transition to the unknown-BCP-configuration state (described below).

In some systems, or at different times within the same system 100, the Announcement Packet may not be sent by the BCCF 400 at the start of a BCP Frame (e.g., to reduce network bandwidth consumed). The BCCF 400 may omit the Announcement Packet, for example, if all or a subset of known BCSFs 402 are communicating as expected and/or one has recently been sent (i.e., in an embodiment where Announcement Packets must be sent every so often or number of BCP Frames). If the Announcement Packet is absent from a BCP Frame, BCSFs 402 may communicate on a pre-determined and/or dynamically selected frequency/channel (if applicable to the communications medium).

In a BLE-based embodiment, upon receipt of a prior Announcement Packet, and in the absence of an Announcement Packet in a BCP Frame, BCSFs 402 may communicate on the BLE channel dictated by the BLE frequency-hopping schedule (as described elsewhere), and/or by (and/or in addition to) another schedule and/or algorithm.

A.3.a.1.c Announcement Packet—BCSF

If applicable to the communications medium, a particular BCSF 402 may not be listening on the corresponding BCCF-selected broadcast frequency/channel (e.g., because it was just powered-on, was reset, has determined it is no longer communicating with the BCCF 400, or because of any other event that may have caused it stop listening on the right frequency/channel [e.g., self-test failure, command, etc.], or a combination of reasons thereof). When in this state (the unknown-BCP-configuration state), the BCSF 402 may listen on a particular frequency/channel, set of frequencies/ channels, or all or a subset of frequencies/channels; the frequency/channel on which to listen may be fixed or selected using a predetermined sequence, randomized sequence, network congestion, or any other method, or combination of methods, as appropriate.

The BCSF 402 may listen for the Announcement Packet on the same frequency/channel (e.g., indefinitely until it is received or for a pre-defined and/or algorithmically defined duration, such as a number of BCP Frames and/or time), different channels (e.g., changing in round-robin fashion, or another sequence, random, etc.), and/or a combination of both and/or other methods (e.g., to mitigate network collisions, seek the frequency/channel on which the BCCF 400 is broadcasting, etc.).

In a BLE-based embodiment, when a BCSF 402 is in the unknown-BCP-configuration state, the BCSF 402 may listen for an Announcement Packet on one or more BLE advertising channels for a pre-determined and/or algorithmically-determined number of BCP Frames (e.g., 3 [the number of possible channels], 4, 6, etc.) in fixed, random, or round-robin fashion. For example, the first advertising channel [37] is observed for 3 BCP Frames, the second advertising channel [38] is observed for 3 BCP Frames, the third advertising channel [39] is observed for 3 BCP Frames, the first advertising channel [37] is observed for 3 BCP Frames, and so on.

A.3.a.1.d Announcement Packet—Format

The Announcement Packet may use other underlying protocols and/or data formats to simplify transport; the Announcement Packet may also be slightly different from other protocols, such that other systems, listening for another protocol, do not unintentionally receive an Announcement Packet. In a BLE-based embodiment, the Announcement Packet may be similar to and/or inspired by the BLE advertising packet (and may use a similar or same underlying data and/or transport format); however, its format and/or content may be intentionally different, such that other BLE devices and/or receivers do not receive it. Using a unique Announcement Packet from other protocols' advertising packets may prevent other systems from unintentionally observing the presence of such sensor networks. An alternate embodiment, wherein the Announcement Packet is the same as the BLE Advertising Packet. An alternate embodiment, wherein the Announcement Packet is combined with the Command Packet.

A.3.b. Command Packet

The Command packet may be broadcast to all or a subset of configured BCSFs 402 from a commanding BCCF 400. Note that BCCFs 400 may include the BCSF 402, and thus, other BCCFs 400 may be recipients of the Command packet. The Command packet may prompt BCSFs 402 to perform an action and/or provide a response to the commanding BCCF 400. The Command packet may include configuration information (e.g., connection information [e.g., "Microlocation Connection" information that allows a Sensor 310 to "sniff" messages from devices 110, etc.], security information, synchronization information [including time], sensor configuration/information, network information, response sequence information, etc.), command information (e.g., protocol start/stop/reset/resynchronize, system reset, perform self-test, synchronize [e.g., time, state, activity/action, etc.], etc.), or other information (e.g., firmware image contents, system state, equipment state, etc.), or a combination thereof. Command packets may be targeted to one or more specific BCSF 402 and/or to one or more classes of BCSFs 402. A BCCF 400 may forward a received Command packet onto its configured BCSFs 402. A Command Packet may contain one or more commands/requests.

In a BLE-based system, BCSFs 402 may correct for clocking variation with this packet.

In a BLE-based system (and also applicable to other systems), to help avoid collisions, BCCFs 400 may send the Command packet after a predefined (e.g., 30 ms) or dynamic delay (e.g., based upon the number of connected devices 110 or detected environmental characteristics, including prior collision counts) after the last message received from a device 110 (if a connection to a device 110 exists).

The Command packet may include the timing offsets (e.g., time-slot) in which each BCSF 402 may communicate.

If all or a subset of BCSFs 402 are communicating as expected, a BCCF 400 may not send a Command packet during a particular BCP Frame (e.g., to preserve bandwidth).

A.3.b.1 Command Packet—Loss and Omission

The communications medium may be not be reliable, and thus, a Command Packet may not reach a particular BCSF 402. The Command Packet may be sent periodically by the BCCF 400 (e.g., after every Announcement Packet, in every BCP Frame, once every N seconds or BCP Frames, etc.), and thus, it may be possible for each BCSF 402 to determine whether or not it has missed an expected Command Packet (e.g., via a counter, elapsed time since last receipt, etc.). If a BCSF 402 has determined that it has missed too many Command Packets (e.g., 3), it may transition to the unknown-BCP-configuration state (described above).

A.3.b.2 Frequency Hopping Schedule Configuration

In the case of radio frequency communications, to enhance or maximize immunity to interference, a scheme of changing frequency is often employed. In BLE, this is referred to as frequency hopping. Adaptive frequency hopping may be used to adjust the hopping schedule based upon detected collisions (which may be used by BLE). The hopping schedule may change for other reasons (e.g., BLE connections to devices 110 are added or removed, system reset, etc.). In BLE-based systems, the BCP follows the BLE frequency-hopping schedule to ensure that it does not interfere with BLE communications.

A.3.c. Response Packet

Upon receiving and processing a Command Packet from a BCCF 400, the BCSF 402 may perform action(s) and/or respond; responses may be sent in a predefined temporal sequence. Note that BCCFs 400 may include the BCSF 402, and thus, other BCCFs 400 may be responders to a Command packet. The temporal response sequence assigns each BCSF 402 a time-slot in which to respond. In a BLE-based system, the response sequence may additionally assign each BCSF 402 a BLE channel on which to respond, in accordance with the current frequency hopping scheme/configuration. The sequence begins with a first BCSF 402 sending its response in its assigned time-slot, followed by each BCSF 402 configured to communicate with the BCCF 400, and then repeating until the BCCF 400 sends a new Command packet.

After or in response to receiving and processing a Command packet from a BCCF 400, each BCSF 402 may apply a time delay based on its identity in the system 100 before sending a response. This delay scheme may help to ensure that BCSFs 402 may respond in a predefined sequence, avoiding collisions and optimizing or enhancing the total response time of the system 100. In BLE-based systems in particular, but also applicable to other non-BLE-based systems, this delay scheme may also be utilized to minimize the bandwidth use of the communications medium. The delay configuration may be contained within the Command Packet.

Responses may be directed and/or broadcast. Responses may be sent in parallel using multiple frequencies to increase system throughput.

BCSFs 402 may send a Response during a BCP Frame in which no Command and/or Announcement is received. For example, if all or a subset of BCSFs 402 are communicating normally, BCSFs 402 may elect to continue to send measurements.

A.3.c.1 Response Packet—Loss and Omission

The communications medium may be not be reliable, and thus, a Response Packet may not reach a particular BCCF 400. The Response Packet may be sent periodically by the BCSF 402 (e.g., after every Command Packet, in every BCP Frame [e.g., even if the Command Packet was omitted, etc.], once every N seconds or BCP Frames, etc.), and thus, it may be possible for a BCCF 400 to determine whether or not it has missed an expected Response Packet (e.g., via a counter, elapsed time since last receipt, etc.) from a particular BCSF 402. If a BCCF 400 has determined that it has missed too many Response Packets (e.g., 3) from a particular BCSF 402, the BCCF 400 may send an Announcement Packet during the next BCP Frame (e.g., if the BCCF 400 had been omitting them). If a BCCF 400 has determined that it has missed too many Response Packets (e.g., 3) from too many BCSFs 402 (e.g., more than 2, strategic BCSFs 402, etc.), the BCCF 400 may transition to the synchronize-configuration state (described above).

A.4. Multiple BCCs or Sensor Hubs

In some cases, it may be beneficial to have multiple BCCFs 400 (i.e., BCCs and/or sensor hubs 121) when there is a great distance between BCSFs 402 (i.e., Sensors 310), obstructions between BCSFs 402, or too many BCSFs 402 for a particular BCCF 400 to manage. When multiple BCCFs 400 are present, a tree network is formed. A given BCSF 402 may be configured to be within more than one BCCF's network, providing redundancy.

A.5. Backchannel Security

Communications between BCSFs 402 and BCCFs 400 may be secure (confidential, integrity verified, or authenticated, or a combination thereof).

A.5.a. Identity

The identity of each individual Sensor 310, sensor hub 121, and backchannel controller 120 (i.e., BCSF 402) may be established by one or more unique identifiers (e.g., a serial number) and/or one or more asymmetric keys (public-key cryptography); asymmetric keys may be embodied within X.509 certificates. There may exist other identifiers and/or keys and/or certificates that authorize or secure communications between BCSFs 402 and BCCFs 400.

Identity identifiers and/or keys/certificates may be determined and/or stored during Sensor 310, sensor hub 121, or backchannel controller 120 manufacturing, or a combination thereof. In one embodiment, keys/certificates are used to establish identity and identifiers are used to assist humans and/or other systems and/or compliment keys/certificates (e.g., the identity of a particular Sensor 310 is authenticated by verifying a key/certificate, but the key/certificate against which to authenticate may be selected amongst a set using a serial number). Alternate embodiments where identity identifiers and/or keys/certificates are determined and/or stored during the manufacturing process of the equipment in which Sensors 310, sensor hubs 121, or backchannel controllers 120, or a combination thereof, are placed, during system assembly, at first use during manufacturing, assembly, system test, in the field (e.g., dynamically), or at any other point before or during the life of the system, or a combination thereof.

An alternate embodiment, where instead of individual identity asymmetric keys/certificates, each BCSF 402 is configured with one or more system-wide asymmetric keys (which may or may not be embodied within X.509 certificates); the keys/certificates may be determined and stored during manufacturing (e.g., manufacturing matched sets of components), at system assembly (e.g., configuring the set after individual components are installed), at first use during manufacturing, assembly, system test, in the field (e.g., dynamically), or at any other point before or during the life of the system, or a combination thereof.

An alternate embodiment, where instead of individual identity asymmetric keys/certificates, each BCSF 402 is configured with one or more system-wide symmetric keys; the keys may be determined and stored during manufacturing (e.g., manufacturing matched sets of components), at system assembly (e.g., configuring the set after individual components are installed), at first use during manufacturing, assembly, system test, in the field (e.g., dynamically), or at any other point before or during the life of the system, or a combination thereof.

An alternate embodiment, where instead of individual identity asymmetric keys/certificates, each BCSF 402 is configured with one or more of individual identity symmetric keys (wherein the BCCF's configuration package contains the appropriate keys for each BCSF 402); the keys may be determined and stored during manufacturing, at system assembly, at first use during manufacturing, assembly, system test, or in the field (e.g., dynamically), or at any other point before or during the life of the system, or a combination thereof.

Alternate embodiments combining individual asymmetric keys, system-wide asymmetric keys, system-wide symmetric keys, and individual symmetric keys to establish or determine identity are possible.

An alternate embodiment, where no asymmetric keys/certificates or symmetric keys are required to determine, establish, or authenticate BCSF 402/BCCF 400 identity.

A.5.b. Network Definition and Authorization

Each BCCF 400 may communicate with zero or more BCFSs and each BCFS may communicate with zero or more BCCFs 400. In a BLE-based system, the same access address may be used amongst all or a subset of sensors 310, sensor hubs 121, and backchannel controllers 120 within a particular system; the access address may be provisioned and/or modified during manufacturing (both if manufacturing sensor sets or if manufacturing individual sensors), during system assembly and/or system test, during maintenance operations (add or remove sensors), or at any other point during the life of the system. In wired systems, all or some components may be wired onto the same bus. In other wireless systems, all or some components may be configured to use the same frequencies, channels, slots, etc. A sensor's ability to communicate on a particular sensor network does not imply it is authorized to do so.

Sensors 310, sensor hubs 121, or backchannel controllers 120, or a combination thereof, of an assembled system may or may not be individually addressable. In a BLE-based system, where a common access address is utilized, Sensors 310, sensor hubs 121, or backchannel controllers 120, or a combination thereof, are not individually addressable (i.e., all or some communications are broadcast); however, the messaging protocol may include a destination field, in which case, although the low-level communications medium may not be individually addressable, messages may still be addressed to individual or groups of Sensors 310, sensor hubs 121, or Backchannel Sensors 310, or a combination thereof.

Each BCCF 400 may only be authorized to communicate with a particular set of BCSFs 402. The public key (or public certificate), or any other appropriate identity identifier/key/ certificate, of each BCSF 402 with which a BCCF 400 is authorized to communicate, may be stored in a configuration package resident in the BCCF 400, as shown in the illustrated embodiment of FIG. 5.

Each BCSF 402 may only be authorized to communicate with a particular set of BCCFs 400. The public key (or public certificate), or any other appropriate identity identifier/key/certificate, of each BCCF 400 with which a BCSF 402 is authorized to communicate, may be stored in a configuration package resident in the BCSF 402.

BCSFs 402 are authorized to communicate with a particular BCCF 400 (i.e., participate in the sensor network comprising or consisting of the set of BCSFs 402 configured to communicate with a particular BCCF 400), when they possess the BCCF-Network-Key key for that BCCF 400 and the appropriate identities have been authenticated (described in the subsequent section). The BCCF-Network-Key is a symmetric key used to encrypt communications to/from a particular BCCF 400 (and may be used prior to any authentication steps, because it is a symmetric key, and thus, it provides basic authorization to communicate). The BCCF-Network-Key may be shared across the system (i.e., the set of Sensors 310, sensor hubs 121, and backchannel controllers 120 installed in a particular piece of equipment) or there may be one for each sensor network in the system.

An alternate embodiment, where BCCFs 400 and/or BCSFs 402 do not maintain configuration packages that list the identities of authorized BCFSs and/or BCCFs 400, and instead, the BCCF-Network-Key key is used as the sole authorization to communicate between a particular BCCF 400/BCSF 402 pair.

BCCF-Network-Key keys may be determined and stored during manufacturing (e.g., manufacturing matched sets of components), at system assembly (e.g., configuring the set after individual components are installed), at first use during manufacturing, assembly, system test, in the field (e.g., dynamically), or at any other point before or during the life of the system, or any combination thereof.

An alternate embodiment, where instead of BCCF-Network-Key keys that are shared amongst sensor networks or entire systems, each BCSF 402 is configured with one or more individual BCCF-Network-Key keys (wherein the BCCF's configuration package contains the appropriate keys for each BCSF 402); the BCCF-Network-Key keys may be determined and stored during manufacturing, at system assembly, at first use during manufacturing, assembly, system test, in the field (e.g., dynamically), or at any other point before or during the life of the system, or any combination thereof.

Alternate embodiments, where the BCCF-Network-Key key is an asymmetric key or X.509 certificate.

Alternate embodiments, where the BCCF-Network-Key key is also the identity key (in both symmetric and asymmetric embodiments [with or without certificates]).

The BCCF-Network-Key key may be cycled periodically, or at particular events (e.g., when adding or removing a Sensor 310, sensor hub 121, or backchannel controller 120 from the system, when there is no activity within, or users of, the system, etc.) as described herein.

A.5.c. Authentication

It is worth noting that each BCCF 400 may authenticate the identity of each BCSF 402, to ensure that information being reported to it is from a valid and expected source. The BCCF 400 may ignore communications from BCSFs 402 that are not considered secure (see description below). The BCCF 400 may authenticate the identity of each BCSF 402 at power-on and/or periodically at pre-defined and/or dynamic/event-driven intervals (as described in the subsequent section). As described above, BCSFs 402 and BCCFs 400 may communicate with one another using communications links encrypted with one or more BCCF-Network-Key keys. Once the BCCF 400 has authenticated a particular BCSF 402, that communications link may be considered secure (the BCSF-BCCF communications link), as described below. In one embodiment, the authentication approach may be similar to TLS server-side authentication using a challenge-response protocol.

An alternate embodiment, where mutual authentication may be performed, in which each BCSF 402 additionally authenticates the identity of each BCCF 400 to which it communicates at power-on and periodically at pre-defined and/or dynamic/event-driven intervals (as described in the subsequent section). In one embodiment, the authentication approach may be similar to TLS client-side authentication using a challenge-response protocol; similar to TLS, it may or may not occur at the same time as BCSF 402 authentication.

An alternate embodiment, where each BCSF 402 is configured with a certificate signed by the BCCF 400, and the BCCF 400 verifies the chain of trust for each BCSF 402 (i.e., each BCSF 402 possesses a certificate signed by each BCCF 400 with which it may communicate). In such an embodiment, it may not be necessary for each BCSF 402 to possess its own unique identity key (symmetric or asymmetric) or certificate, if mutual authentication between BCCF 400 and BCSF 402 is not required, since each BCSF 402 may just possess BCCF-signed certificates. In one embodiment, the authentication approach may be similar to TLS server-side authentication using certificate chain verification.

An alternate embodiment, where each BCCF 400 is configured with a certificate signed by the BCSF 402, and the BCSF 402 verifies the chain of trust for each BCCF 400 (i.e., each BCCF 400 possesses a certificate signed by each BCSF 402 with which it may communicate). In such an embodiment, it may not be necessary for each BCCF 400 to possess its own unique identity key (symmetric or asymmetric) or certificate, if mutual authentication between BCSF 402 and BCCF 400 is not required, since each BCCF 400 may just possess BCSF-signed certificates. In one embodiment, the authentication approach may be similar to TLS client-side authentication using certificate chain verification.

An alternate embodiment, where mutual authentication is performed by combining the above two alternate embodiments. In one embodiment, the authentication approach may be similar to TLS mutual authentication using certificate chain verification.

An alternate embodiment, where the BCSF-BCCF communications link may be considered secure without authenticating BCSFs 402 (i.e., the BCCF-Network-Key key indicates authorization and is used to encrypt communications, and communications are integrity verified, but BCSFs 402/BCCFs 400 are not authenticated).

An alternate embodiment, where the BCSF-BCCF communications link may not be secure (i.e., the BCSF 402 may not be authenticated and/or information may not be encrypted and/or integrity verified).

A.5.d. Session Keys

Figure 5:
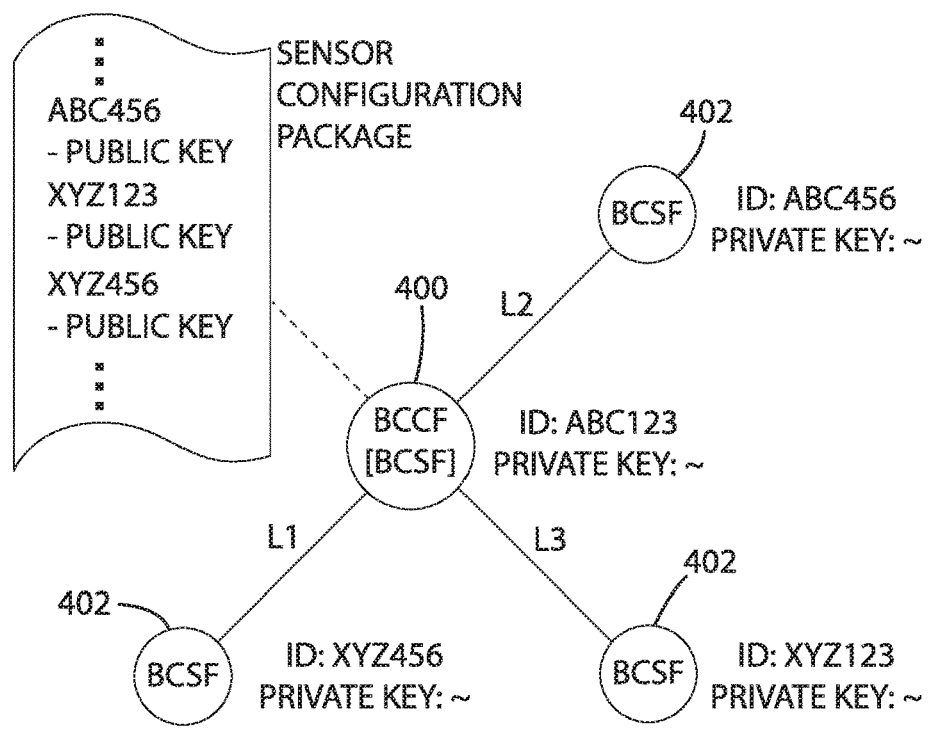
FIG. 5 shows a sensor backchannel security model in accordance with one embodiment.
Figure 6:
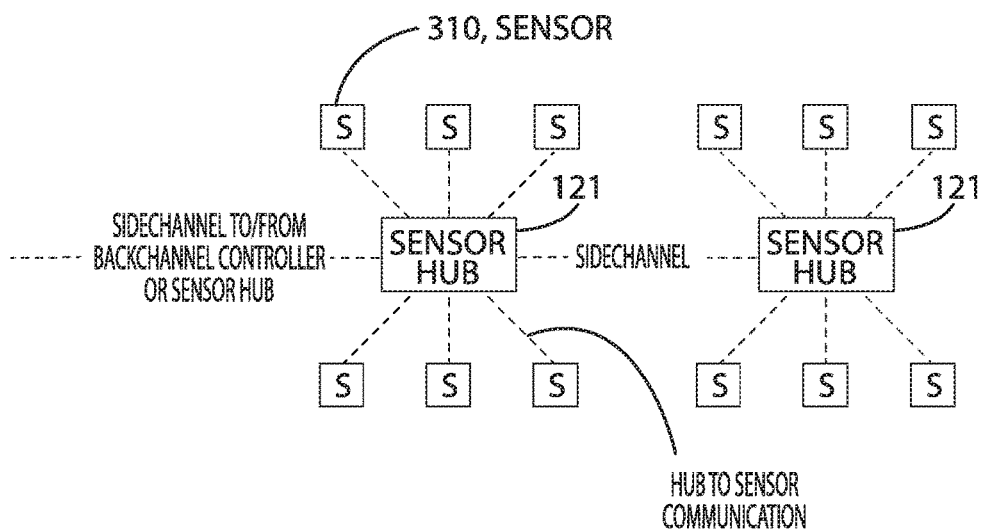
FIG. 6 shows a multiple sensor hubs connected via a sidechannel in accordance with one embodiment.

As described, and as shown in the illustrated embodiment of FIG. 5 (i.e., L1, L2, and L3), each BCSF 402 communicates with one or more configured BCCFs 400 using a secure communications link (the BCSF-BCCF communications link). The BCSF-BCCF communications link may be secured using a session key (the BCSF-BCCF-Session-Key); the BCSF-BCCF-Session-Key key may be a symmetric key calculated during the challenge-response authentication process described below (similar to a TLS session key). The BCSF-BCCF-Session-Key may be used in addition to, or for BCSF 402/BCCF 400 pairs that have been authenticated, instead of, the BCCF-Network-Key key. The BCSF-BCCF-Session-Key key may also be the same as the BCCF-Network-Key key, or a derivative of the BCCF-Network-Key key, wherein the BCSF-BCCF-Session-Key key is not calculated during the challenge-response authentication process described below, and instead, the BCCF-Network-Key key, or a derivative of it, is used (i.e., the BCSF-BCCF-Session-Key key may not be used or may be computed using an algorithm based upon the BCCF-Network-Key key). To improve system performance and responsiveness within the system's constrained components, the BCSF-BCCF-Session-Key key may survive connections (in a manner similar to TLS session resumption) and may be cycled periodically, as described herein.

A.5.d.1 Challenge-Response

The BCSF-BCCF-Session-Key may be derived for each BSCF/BCCF pair using the identity and/or other appropriate keys (symmetric or asymmetric) and/or certificates, during a challenge-response authentication process similar to TLS/DTLS, or in accordance with one or more embodiments described in U.S. Provisional Patent Application No. 62/413,966, entitled SYSTEM AND METHOD FOR AUTHENTICATING AND AUTHORIZING DEVICES AND/OR FOR DISTRIBUTING KEYS, filed Oct. 27, 2016, to Smith et al.—the disclosure of which is incorporated herein by reference in its entirety—or via any other applicable method.

The challenge-response authentication process may be employed using a broadcast Command or by individual, directed messages. The challenge-response authentication process may also be integrated within the messaging scheme used by the system, as appropriate to the authentication scheme of the system (e.g., for each message sent from a BCCF 400/BCSF 402 that the system authentication scheme indicates should be authenticated, the sender may include, with each message sent, an encrypted nonce the sender received from a prior response from the receiver [bootstrapped to zero or some other known value], and for broadcast messages [or alternately instead of an encrypted nonce for all or a subset of messages], a signature [or portion thereof] of the sent message, or any other applicable challenge-response protocol, message authentication code, or other technique [as appropriate to the utilized keys and/or certificates], etc.).

Broadcast messages, such as the Command Packet (described in Section A.3.b), may be received by more than one BCSF 402, and thus, may be secured using only the BCCF-Network-Key key. In alternate embodiments, where a BCCF-Network-Key key, or another appropriate key, is not shared across the BCSFs 402 communicating with a particular BCCF 400, broadcast messages may either be secured using a broadcast-specific BCCF-Network-Key key (e.g., a BCCF-Network-Broadcast-Key key) that is shared across the BCSFs 402 communicating with a particular BCCF 400 (and/or the system), secured by another shared identifier or key, or not secured. As described elsewhere, responses to a broadcast message, and other directed messages, are communicated using the BCSF-BCCF communications link.

In a BLE-based system embodiment, a system-wide BCCF-Network-Key key is used to secure communications across all or a subset of BCSF-BCCF communications links in the system; BCSF 402 identity is authenticated using a Command/Response-based challenge-response protocol; and additional session keys are not utilized, so that BCSFs 402 are able to aggregate data from other BCSFs 402 (as described herein).

An embodiment where P-192 (secp192r1) Elliptic Curve (asymmetric) cryptography (ECC) is used. An embodiment where P-256 (secp256r1) Elliptic Curve (asymmetric) cryptography (ECC) is used. An embodiment where P-384 (secp384r1) Elliptic Curve (asymmetric) cryptography (ECC) is used. An embodiment where P-521 (secp521r1) Elliptic Curve (asymmetric) cryptography (ECC) is used. An embodiment where RSA (asymmetric) cryptography is used. An embodiment where AES-128 (symmetric) cryptography is used. An embodiment where AES-192 (symmetric) cryptography is used. An embodiment where AES-256 (symmetric) cryptography is used.

A.6. Sidechannel Communications

If multiple backchannel controllers 120 or sensor hubs 121 exist in a system, one embodiment according to the present disclosure may utilize two or more of them to communicate with each other. See e.g., the illustrated embodiment of FIG. 6.

The Sidechannel may be used to transfer connection information from one sensor hub 121 or backchannel controller 120 to another (i.e., to transfer a "Microlocating Connection" from one to another), to prevent a device 110 from requiring to reconnect to, or be aware of the existence of, other related sensor hubs 121 and backchannel controllers 120. The Sidechannel may be provided using the backchannel (i.e., they may be the same sensor network and/or use the same or similar concepts).

A.6.a. Sidechannel Security

One or more Sidechannel (BCCF-BCCF) security concepts may be similar to one or more Backchannel security concepts (see Section A.5). Sidechannel and Backchannel identity keys and/or certificates may be the same. Sidechannel and Backchannel keys (symmetric and/or asymmetric) and/or certificates used to secure communications may be different and may be calculated differently. For example, whereas the Backchannel for BCCF-A may use a system-wide symmetric encryption key K1, and BCCF-B may use a system-wide symmetric encryption key K2, BCCF-A-to- BCCF-B may use a connection-specific symmetric encryption key K3 calculated as part of a challenge-response authentication protocol.

A.7. Backchannel Modes of Operation

In certain embodiments, it may beneficial for the Backchannel to have several modes of operation. These modes can be used to assist in minimizing, maximizing, enhancing or diminishing characteristics of the system. For example, entering "Sleep" and/or "Standby" modes may be beneficial from a power consumption standpoint. Switching between backchannel modes may be accomplished though methods such as being commanded to do so by some system resource, by timing, by external input, or by some other method.

A.8. Microlocation of Multiple Devices

The microlocation system may simultaneously microlocate multiple devices 110. The system may be implemented in conjunction with one or more embodiments described in U.S. Nonprovisional application Ser. No. 14/620,959 to J. Michael Ellis et al., filed Feb. 12, 2015, and entitled SYSTEM AND METHOD FOR COMMUNICATING WITH A VEHICLE, and U.S. Provisional Appl. No. 62/323,262 to Raymond Michael Stitt, filed Apr. 15, 2016, and entitled SYSTEM AND METHOD FOR ESTABLISHING REAL-TIME LOCATION—the disclosures of which are incorporated herein by reference in their entirety. The backchannel and sidechannel communications may support the transport of simultaneous information related to multiple devices 110.

A.9. Backchannel and Sidechannel Measurements

The microlocation system (Sensors 310, sensor hubs 121, or backchannel controllers 120, or a combination thereof) primarily measures attributes of signals sent to or received from devices 110, as described in Section A.2. As part of backchannel communications (as described in Section A.3 and other sections) and sidechannel communications (as described in Section A.6), Sensors 310, sensor hubs 121, or backchannel controllers 120, or a combination thereof, may send messages to one another. These messages may be measured and/or processed in the same way that messages from devices 110 are measured and/or processed (i.e., information and/or signal attributes may be measured, computed, processed, or transformed, or a combination thereof, from backchannel and/or sidechannel communications from one or more Sensors 310, sensor hubs 121, or backchannel controllers 120, or a combination thereof, sent to or received from other Sensors 310, sensor hubs 121, or backchannel controllers 120, or a combination thereof).

The ability to measure environmental effects on backchannel and/or sidechannel communications may be based on use of an RF (e.g., BLE), ultrasonic, or similar backchannel and/or sidechannel, wherein, as described herein, communications characteristics may be measured between Sensors 310, sensor hubs 121, and backchannel controllers 120 that are influenced by the environment in which the system is located, allowing the system to assess said environment. Each BCCF's sensor network is fully-connected, allowing each Sensor 310, sensor hub 121, or BCC 120, or a combination thereof, to measure attributes of every message (including Announcement Packets, Command Packets, or Response Packets, or a combination thereof) sent/received from every other Sensor 310, sensor hub 121, or BCC 120, or a combination thereof, allowing each Sensor 310, sensor hub 121, or BCC 120, or a combination thereof, to produce measurements from their position in the network for every message, providing roughly an additional $N*(N+2)$ measurement opportunities for each message in each BCP Frame, where N is the number of Sensors 310 (e.g., in a 8 Sensor system, an additional 80 measurement opportunities are created per packet per BCP frame [1600 opportunities per second at 20 Hz]). In a wired, optical, or similar backchannel and/or sidechannel, the environment in which the system is located has little effect on communications characteristics.

The information obtained from measuring and/or processing backchannel and/or sidechannel communications may be communicated and/or combined with other backchannel and/or sidechannel information, via backchannel and/or sidechannel communications, to assist in the microlocation of one or more devices 110. For example, the information may allow the system to determine in what sort of environment it resides, the presence (or absence) of obstructions or objects nearby, relative performance of different system components (e.g., absolute, relative to a known baseline, relative to one another, etc.), and so on. In a BLE-based system, observing the RSSI at each Sensor 310, sensor hub 121, or backchannel controller 120, or a combination thereof, as received from transmissions from other Sensors 310, sensor hubs 121, or backchannel controllers 120, or a combination thereof, may allow the system to determine whether it is located in a high noise (RF) or high background power (RF) environment, in a highly reflective environment, in a highly attenuated environment, whether an obstruction (e.g., a human body, another vehicle) exists between or near system components.

The information obtained from measuring and/or processing backchannel and/or sidechannel communications may be used within backchannel and/or sidechannel communications to adjust algorithms used to collect and/or process information and/or signals; increase or decrease the rate of communication; alter the way in which information is propagated across the network (i.e., route around an obstruction, add redundancy, switch to a mesh topology, relax tolerances, add additional error correction codes and/or methods, retry/retransmit messages, etc.); increase or decrease the transmit power of Sensors 310, sensor hubs 121, or backchannel controllers 120, or a combination thereof; alter the weights of certain measurements and/or attributes for certain Sensors 310, sensor hubs 121, or backchannel controllers 120, or a combination thereof, within various filters and/or algorithms; and so on.

The information obtained from measuring and/or processing backchannel and/or sidechannel communications may also be combined with the measurements and/or processing of device 110 communications to alter system-level behavior, such as selecting environment-specific microlocation algorithms, integrating environment knowledge into the microlocation algorithm to remove low probability and/or uncertain measurements and/or calculations, altering the weights given to the various inputs to and/or outputs from microlocation algorithms and/or their aggregators/combiners, to communicate the presence of an obstruction near (or within a particular location) relative to the system, and so on.

Backchannel and/or sidechannel communications may occur in the absence of any device 110, and thus, the information obtained from measuring and/or processing backchannel and/or sidechannel communications may allow the system to obtain relevant information in the absence of devices 110. In a BLE-based system, for example, this method allows the system to determine the background power without the presence of a communicating device 110.

A.10. Backchannel and Sidechannel Transmit Power

As described herein, the backchannel and/or sidechannel may adjust their transmit power (if applicable) based upon information obtained from backchannel and/or sidechannel communications.

A.11. Cascading and Relaying of Sensor Replies

A method of cascading and relaying sensor 310 replies may be used to minimize or reduce the overall time considered necessary to communicate the sensor 310 data related to device 110 microlocation, as well as to overcome impediments to the transfer of measurement data from the sensors 310. An additional benefit of the overall reduced communication time is that if one or more sensor 310 measurements are lost in transmission, another set of data will be made available sooner.

In a typical, non-cascaded implementation with no sensor relaying, a message is broadcast to the sensors and replies from the sensors are received one at a time. For the explanation below, it is assumed that the broadcast message is used to initiate sensors 310 taking measurements. See e.g., the illustrated embodiment of FIG. 7.

Figure 7:
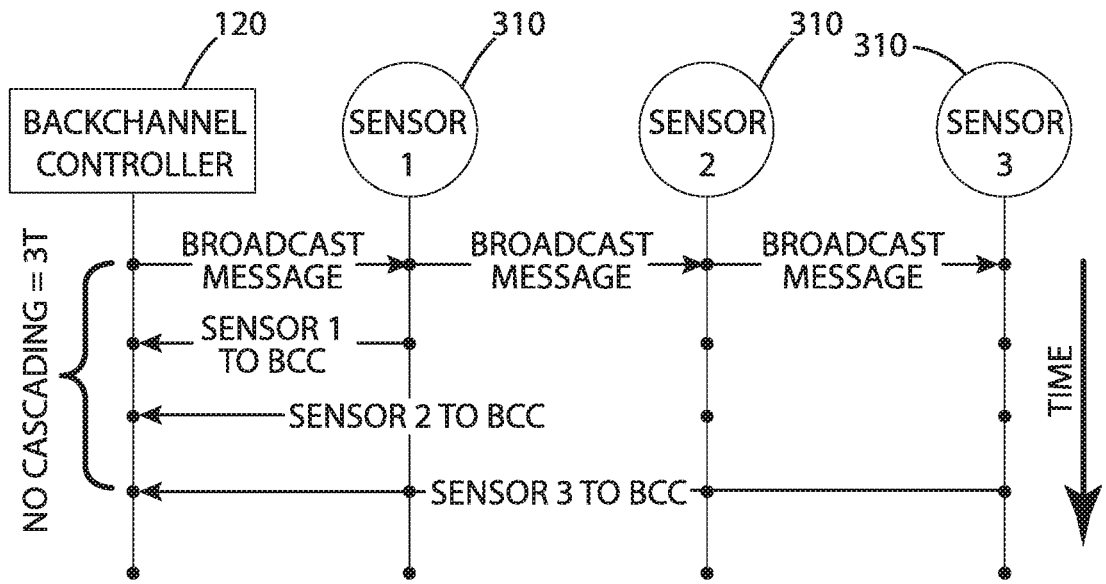
FIG. 7 shows three sensor replies in a non-cascading embodiment.

Assuming time is displayed in the vertical axis, this broadcast is shown as the first horizontal line in FIG. 7. Subsequent to the broadcast message, the replies are transmitted from the Sensors 310 to the backchannel controller 120, one at a time.

The opportunity for simultaneous transfers may facilitate reduction in overall reply time. In the case of a system whose backchannel is implemented via radio frequencies, similar to the case for a possible BLE system, the ability for multiple sensors to transmit simultaneously on different frequencies may facilitate reducing the overall time required to collect all or a subset of sensor measured data. As can be seen in the illustrated embodiment of FIG. 8, two frequencies (Freq A and B) may be used by the sensors to allow simultaneous communication.

Similarly, the ability of a sensor to not only hold its own measurement data, but to relay (receive, store, and forward) other sensor measurement data may be helpful in reducing the overall time required to collect all or a subset of sensor measured data. As can be seen in the illustrated embodiment of FIG. 8, Sensor 2 receives measurement data from Sensor 3 (via frequency B) while Sensor 1 is communicating its measurement data to the backchannel controller 120 via frequency A. When Sensor 2 transmits to the backchannel controller 120 (via frequency A), it is sending its measurement data along with the relayed measurement data from Sensor 3. Also note that a sensor hub 121 may also be used to relay (receive, store, and forward) Sensor 310 measurement data before passing it on toward the Location Determining Facility.

Figure 8:
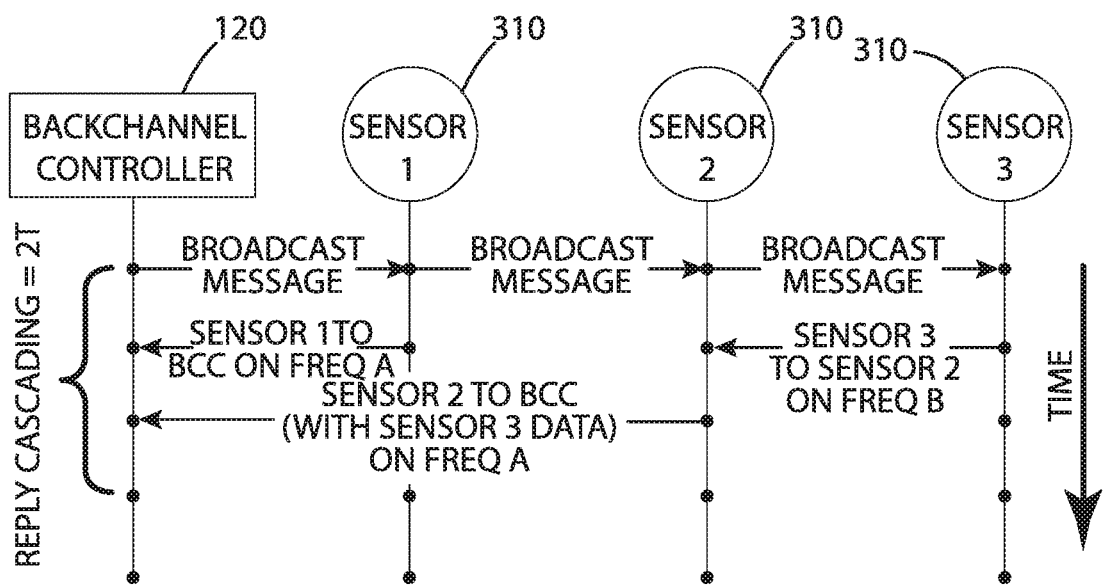
FIG. 8 shows three sensor replies in a cascading embodiment.
Figure 9:
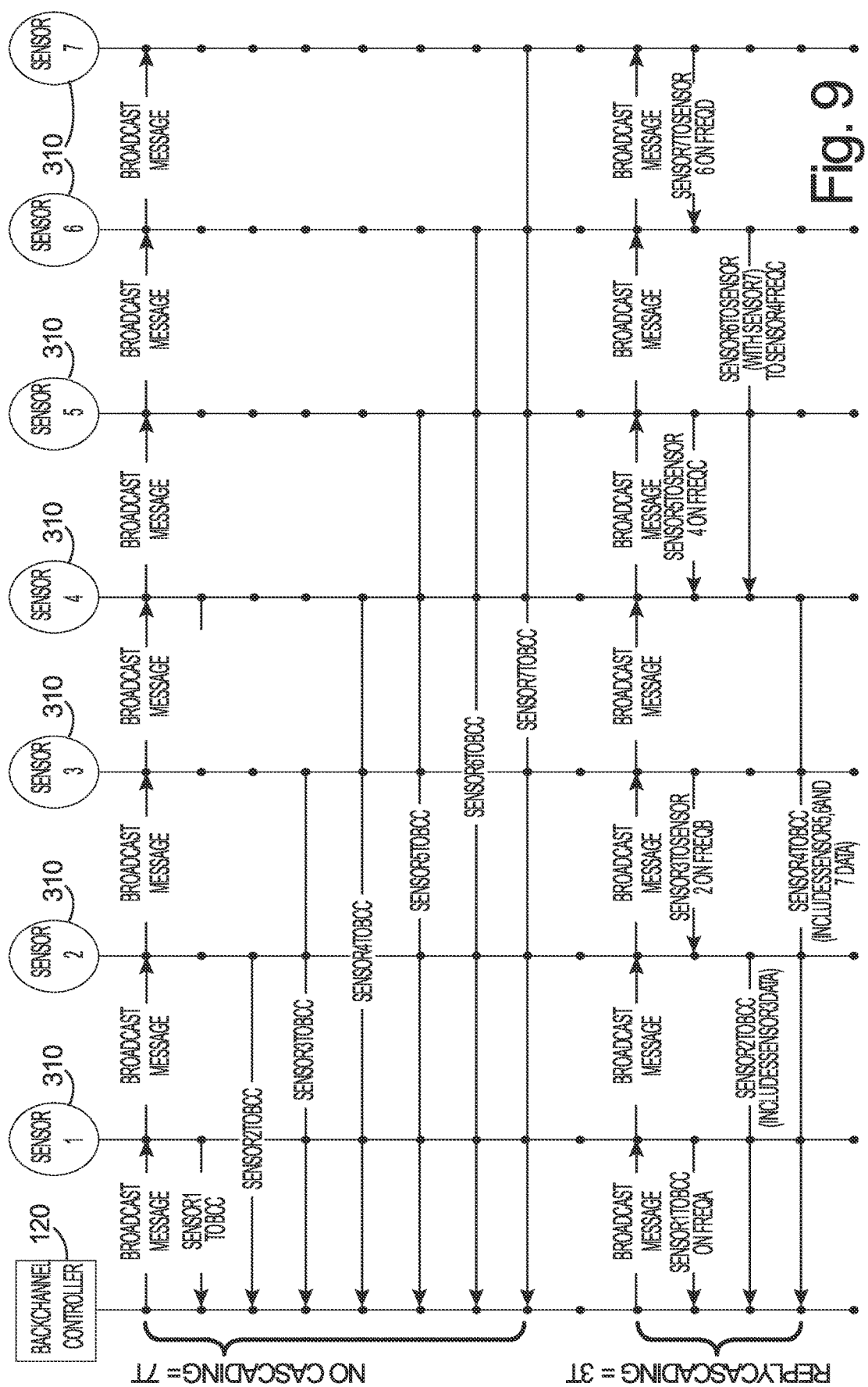
FIG. 9 shows a seven sensor configuration with cascading and relay of measurement data in accordance with one embodiment.
Figure 13:
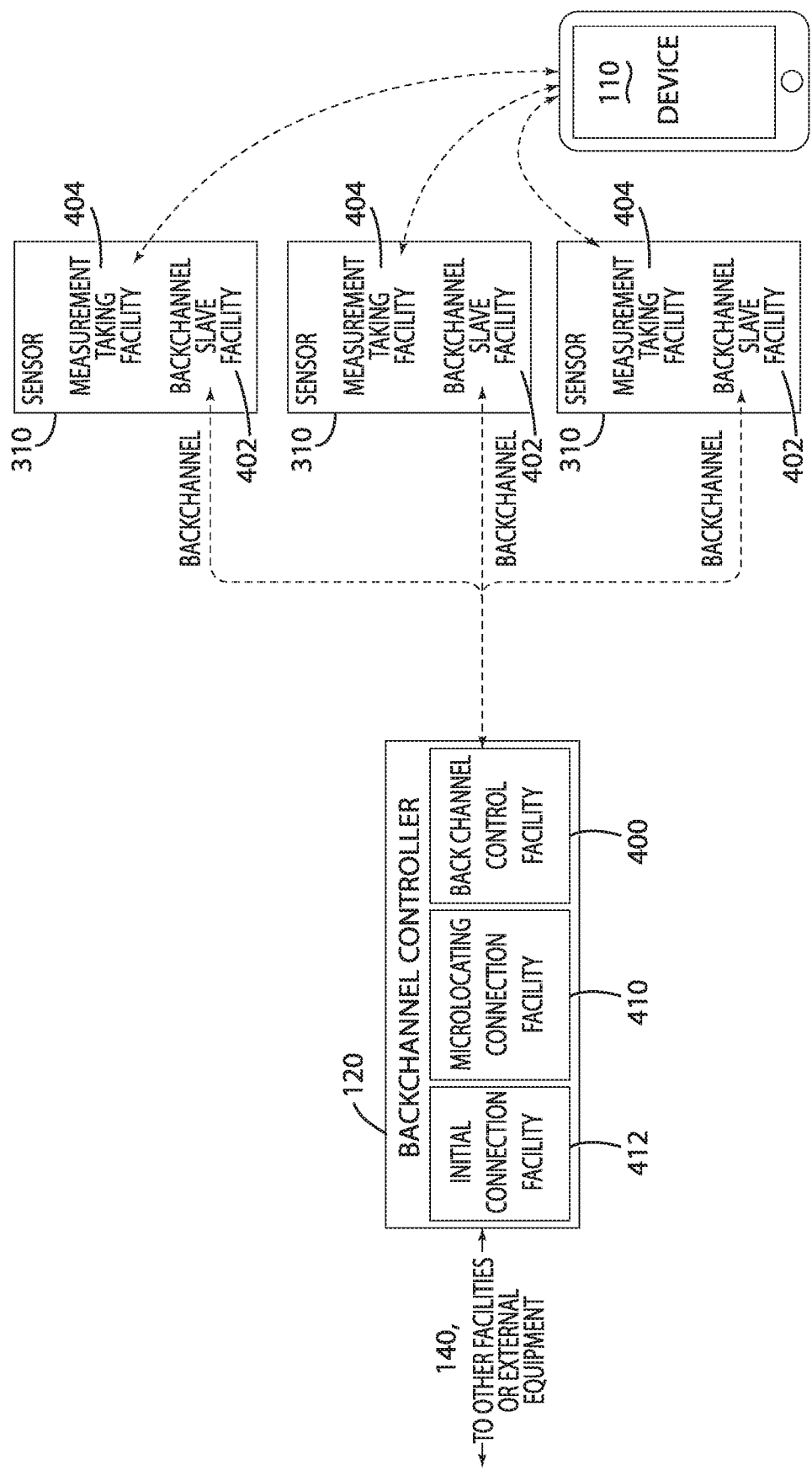
FIG. 13 shows a device to sensor or sensor to device configuration in accordance with one embodiment.

By employing the cascading and relaying of Sensor 310 data as depicted in the illustrated embodiment of FIG. 8, there may be a reduction in overall data collection time from 3T to 2T time units. A more dramatic reduction in overall time can be seen in the illustrated embodiment of FIG. 9, where the overall data collection time is reduced from 7T time units to 3T time units.

The availability of the following will affect the overall reduction in time required to receive all or a subset of sensor 310 measurements:

The number of channels the backchannel controller 120 or a sensor hub 121 may receive simultaneously.

The number of communication channels available for Sensor 310 to Sensor 310 communication.

The number of sets of sensor measurement data that can be relayed (received, stored, and forwarded) via a sensor 310.

The possible relaying of sensor 310 measurement data provides a method to overcome situations where the sensor 310 does not have a reliable or practical communication path to the backchannel controller 120 or sensor hub 121. Note that this solution may involve the capability of the backchannel controllers 120 or sensor hubs 121 to send messages to the sensors 310 that do not have a reliable or practical communication path to the backchannel controller 120 or sensor hub 121; in one embodiment, one or more Sensors 310 may replicate the backchannel controllers 120 or sensor hubs 121 broadcast messages to enhance reliability. See e.g., the illustrated embodiments of FIG. 10 for example timing and FIGS. 11A-D. As described previously, one or more sensors 310 may relay measurement data received from one or more other sensors 310. Which set of sensors 310 communicate which set of measurement data may vary from system to system based upon many factors, such as desired performance, desired reliability, sensor 310 connectivity, the available bandwidth and/or throughput in the sensor 310 to controller 120 or sensor hub 121 communications link, and so on. In one embodiment, where the sensor 310 to controller 120 or sensor hub 121 communications link possesses adequate bandwidth and/or throughput, all sensors 310 may relay all measurement data from all other sensors 310. In another embodiment, where the sensor 310 to controller 120 or sensor hub 121 communications link is bandwidth and/or throughput constrained, only one or two sensors 310 may relay measurement data received from one or two other sensors 310. Additionally, as described earlier, measurement data may be communicated between sensors 310, controllers 120, and/or sensor hubs 121, substantially simultaneously by using multiple frequencies, thus improving measurement data transfer performance. Such an approach may be used with any relaying embodiment, including those described above. In alternate embodiments, instead of communicating measurement data simultaneously (in parallel) between sensors 310, controllers 120, and/or sensor hubs 121 using multiple frequencies, sensors 310 may receive measurement data from other sensors 310 using the same frequency used to communicate with the controller 120 or sensor hub 121 (i.e., instead of sensors 310 transmitting measurement data on multiple frequencies in parallel, each sensor 310 just receives [e.g., sniffs] the measurement data from each other configured sensor 310 as it transmits measurement data to the controller 120 or sensor hub 121).

A.12. Unreliability and Retry

Commands to perform measurements which are sent to the Sensors 310 are not acknowledged, other than by the sensor 310 providing the requested measurement data. This lack of acknowledgement, and possible loss of measurement data may be considered acceptable, since the measurements are taken at a very high rate and the missing data may be considered insignificant. The backchannel controller 120 may issue a retry to recover from any lost packets, making the Backchannel more reliable when needed. Performing sensor reconfigurations, changing of scheduling, and firmware downloads are examples where retries are likely required.

A.13. Shared Sensors

Under certain circumstances, it may be beneficial for a Sensor 310 to communicate to more than one sensor hub or backchannel controller 120. See e.g., the illustrated embodiment of FIG. 12.

B. Embodiments

The following embodiments illustrate some possible uses and implementations of the disclosed system and methods.

In general, the disclosed system and method may be embodied within any microlocation system; in particular, BLE-based systems, but also UWB, ultrasonic, IEEE 802.15.4. Such systems may additional be embodied within many applications, some of which may be identified within referenced disclosures.

B.1. Device Connects to Sensors Embodiment

In this embodiment, the device 110 initiates a connection, optionally using radio frequency methods, directly to the sensors. This is a traditional method used in microlocation systems, whereby the device 110 individually connects to Sensors 310. After the device 110 connects, the sensors 310 are able to determine rough proximity to the device 110, optionally by obtaining a Received Signal Strength Indication (RSSI). Accumulated RSSI information may be communicated, collected, and analyzed by the device 110 to determine device 110 microlocation. With the addition of a backchannel (i.e., a backchannel controller 120 that communicates with each Sensor 310), Sensors 310 may send information to the backchannel controller 120 to also accumulate and analyze; however, each device 110 still connects to each Sensor 310 individually. An example backchannel system and method applied to such a microlocation system is provided below in the illustrated embodiment of FIG. 13.

B.2. Sensors Connect to Device (Opposite of Traditional) Embodiment

In this embodiment, the Sensor 310 initiates a connection, optionally using radio frequency methods, directly to the device 110. After connecting to the device 110, the Sensors 310 are able to determine rough proximity to the device 110, optionally by obtaining a Received Signal Strength Indication (RSSI). Accumulated RSSI information may be communicated, collected, and analyzed by the device 110 to determine device 110 microlocation. With the addition of a backchannel (i.e., a backchannel controller 120 that communicates with each Sensor 310), Sensors 310 may send information to the backchannel controller 120 to also accumulate and analyze; however, each Sensor 310 still connects to each device 110 individually. An example backchannel system and method applied to such a microlocation system is also described in connection with the illustrated embodiment of FIG. 13.

B.3. Sensors Sniffing Device to BCC Communications Embodiment

In this embodiment, which may be implemented in conjunction with one or more embodiments described in U.S. Provisional Appl. No. 62/323,262 to Raymond Michael Stitt, filed Apr. 15, 2016, and entitled SYSTEM AND METHOD FOR ESTABLISHING REAL-TIME LOCATION—the disclosure of which are incorporated herein by reference in their entirety, sensors 310 are used to "sniff" RF communications between one or more devices 110 and one or more Microlocating Connection Facilities (MCFs 410). The microlocation system may be based on sensors 310 monitoring established MCF-to-Device connections and accumulating RSSI and other information. Accumulated information may be communicated, collected, processed, transformed, or analyzed, or any combination thereof, using the backchannel and/or sidechannel, by one or more Location Determining Facilities (LDF) on one or more sensors 310, sensor hubs, or backchannel controllers 120, or any combination thereof to determine the microlocation of one or more devices 110.

Figure 14:
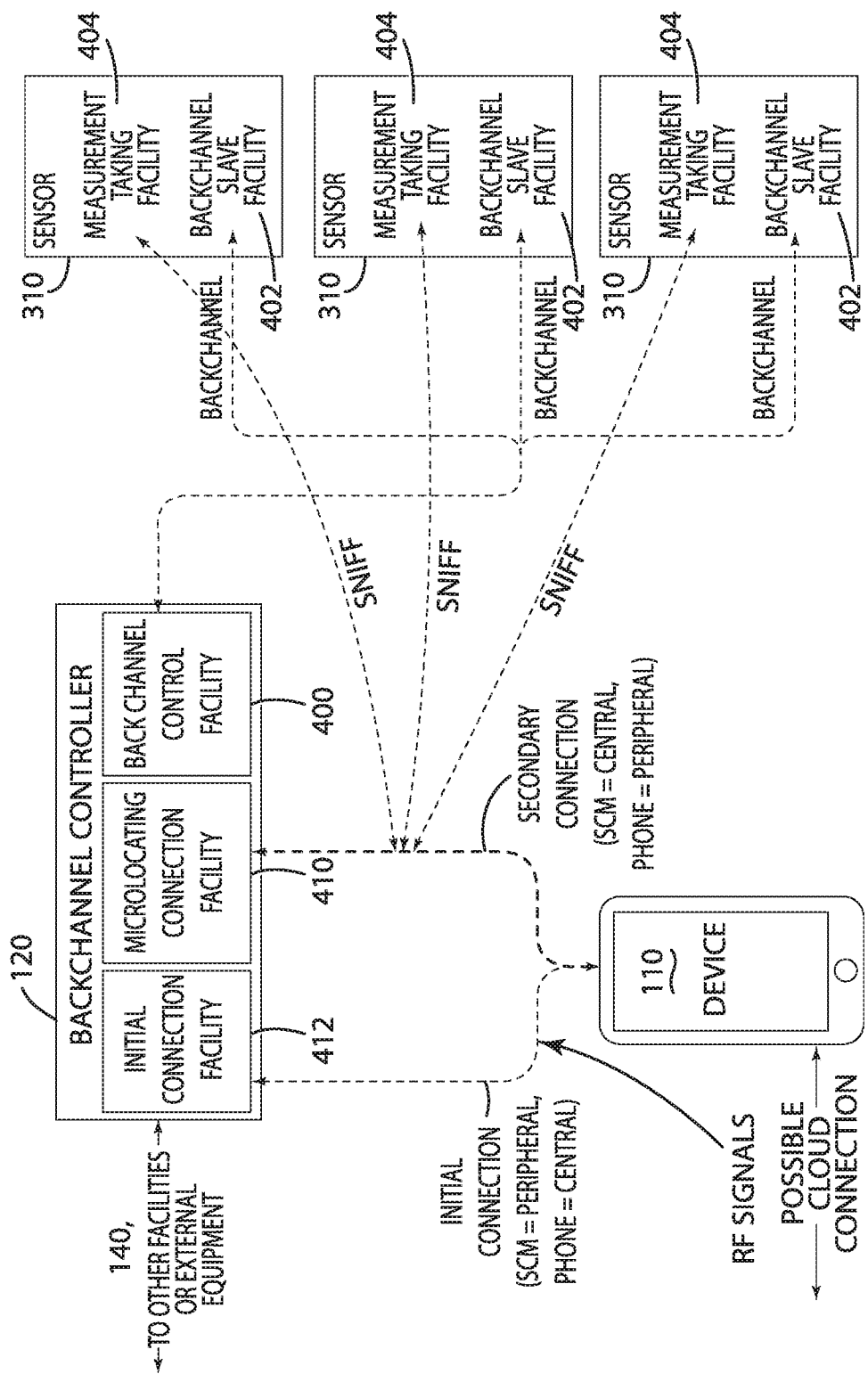
FIG. 14 shows sensors sniffing device to BCC communications in accordance with one embodiment.
Figure 15:
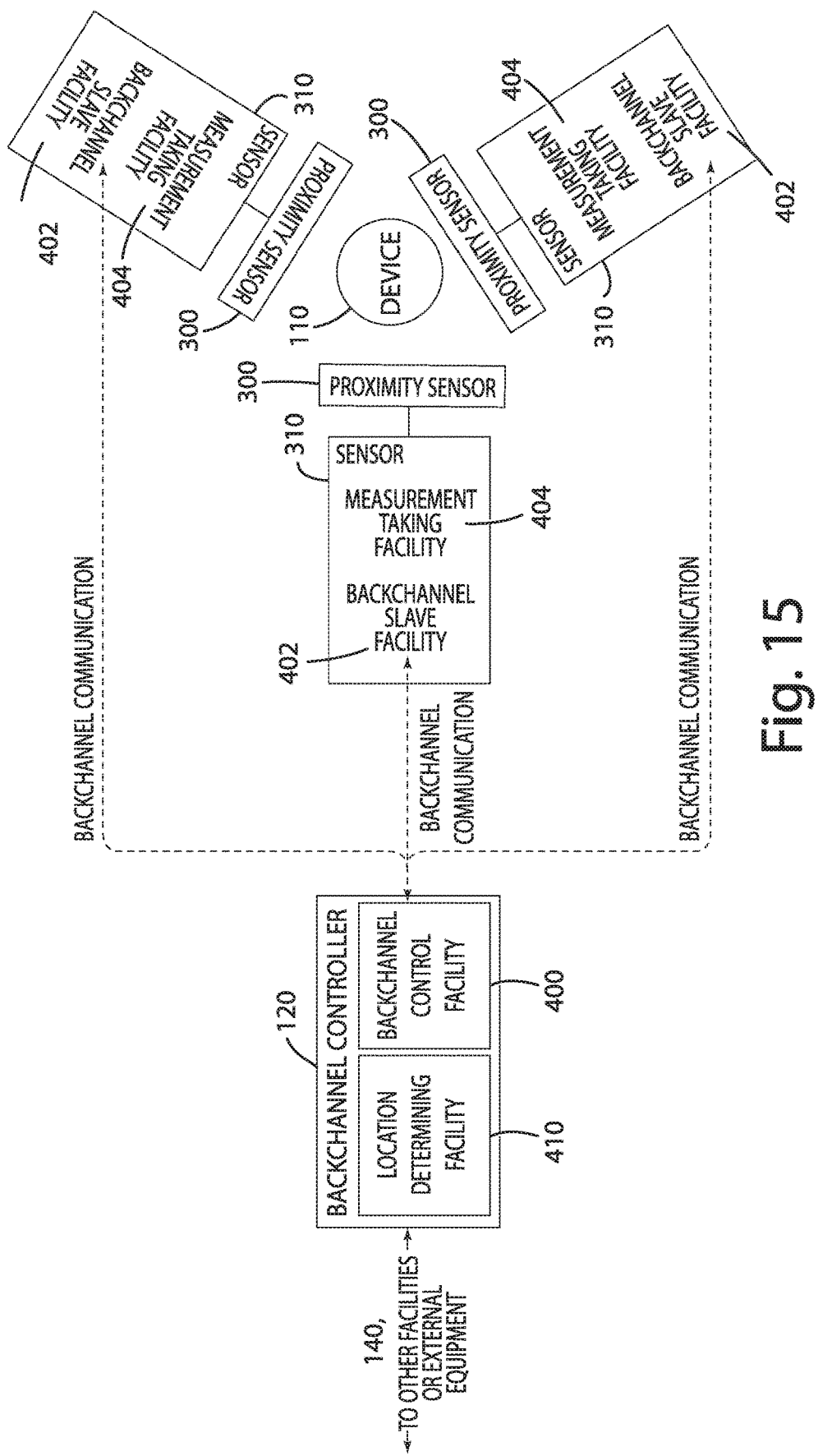
FIG. 15 shows using backchannel to collect measurement data from proximity sensors in accordance with one embodiment.

An example backchannel system and method applied to such a microlocation system is shown in the illustrated embodiment of FIG. 14.

An embodiment of the "sniffing," BLE-based microlocation system with a BLE-hardware-based wireless backchannel and sidechannel.

Communications and connection parameters between the BCC 120 and the portable device 110 and monitoring or sniffing the communications in the one or more sensors 310 may be conducted in a variety of ways. In one embodiment, communications may occur based on establishing an initial connection on a communication link between the portable device 110 and the BCC 120, where the portable device 110 provides connection parameters (although the connection parameters may be provided by the BCC 120 or negotiated in establishing the connection). And, after the initial connection is established, the BCC 120 may negotiate a primary connection on the communication link where the BCC 120 provides connection parameters (or negotiates connection parameters with the portable device 110). After the primary connection is established, the master device 110 and the portable device 10 may drop the initial connection. It should be understood that, in one or more embodiments, the initial connection may be utilized as the primary connection. In one embodiment, the connection parameters may define a connection schedule for the BLE connection between the portable device 110 and the BCC 120.

Examples of parameters for the communication link in the realm of Bluetooth LE, such as connection parameters and schedule parameters, may include one or more of the following parameters:

Connection status—connection or timed out
Connection interval
Connection sleep clock accuracy
Longest connection event window the central or master device allows for each connection event
Connection frequency hop interval
Connection adaptive frequency hopping channel map
Connection slave latency
Connection supervision time-out period
Connection CRC initialization value
Central and peripheral access addresses, or master device and portable device assess addresses
Connection temporary key
Connection long-term key Connection parameters may be utilized to pass information of the connection from one system component to another, such as from the BCC 120 to the sensor device 310. Using these connection parameters, the sensor device 310 may monitor or sniff communications transmitted via the communication link between the BCC 120 and the portable device 110. The communications being monitored may be transmitted from the BCC 120 and/or the portable 110.

B.4. No Sensor Data/Control System Embodiment

In this embodiment, the backchannel and/or sidechannel are used to communicate initial configuration data, ongoing commands (such as control commands and/or feedback from control systems), and other non-measurement information across Sensors 310, sensor hubs, or backchannel controllers 120, or any combination thereof.

B.5. Sensors Communicating Physical Property Embodiment

In this embodiment, sensors 310 may be used to measure some physical phenomenon such as heat, pressure, light, or motion. In some cases, the physical property being measured by the sensors is changing rapidly. To ensure the sensors are capturing the state of the physical phenomenon in a synchronized manner, and communicating the measured values to a central location, an example backchannel system and method applied to such a microlocation system is also described in connection with the illustrated embodiment of FIG. 15. This central location may record the measured information or initiate some action based on the measured information.

The present disclosure provides one or more embodiments for a method to synchronize, monitor and communicate with distributed sensors in a microlocation system; in particular, wirelessly.

As described in one or more embodiments herein, an embodiment according to the present disclosure may allow one to assemble a sensor network using only a single radio on each node, with communications interleaved with standard BLE protocols. Additionally, because of the efficiency of the backchannel protocol, sensor data may be obtained in a timely manner, with additional environmental information that further supports microlocation.

The present disclosure is described primarily for use with BLE and BLE-hardware; however, it may be applied to any communications medium (wired and/or wireless). Other wireless protocols are good candidates for its application, including UWB.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The invention claimed is:

1. A method of communicating sensor information from a plurality of sensor devices to a controller device, said method comprising:
    obtaining a sensed characteristic in each of a first sensor device and a second sensor device;
    generating sensor information indicative of the sensed characteristic obtained in each of the first sensor device and the second sensor device;
    transmitting the sensor information from the second sensor device to the first sensor device; and
    transmitting, from the first sensor device to the controller device, the sensor information received by the first sensor device from the second sensor device and the sensor information indicative of the sensed characteristic obtained in the first sensor device.

2. The method of claim 1 comprising obtaining a sensed characteristic in a third sensor device, and generating sensor information indicative of the sensed characteristic obtained in the third sensor device.

3. The method of claim 1 comprising generating, in the second sensor device, the sensor information indicative of the sensed characteristic obtained in the second sensor device.

4. The method of claim 1 comprising generating, in the first sensor device, the sensor information indicative of the sensed characteristic obtained in the first sensor device.

5. The method of claim 1 wherein the sensed characteristic obtained in the first sensor device is different from the sensed characteristic obtained in the second sensor device.

6. The method of claim 1 comprising transmitting a command packet from the controller device to at least one of the plurality of sensor devices.

7. The method of claim 1 comprising communicating connection parameters for receiving, in the plurality of sensor devices, communications with a portable device, and wherein the sensed characteristic is indicative of the received communications, wherein the portable device transmits data to the controller device.

8. The method of claim 7 wherein the communications with the portable device are at least one of transmitted from the portable device and transmitted to the portable device.

9. The method of claim 7 wherein the connection parameters pertain to communications established between the portable device and another device other than the plurality of sensor devices.

10. The method of claim 7 wherein the sensed characteristic is at least one of signal strength, angle of arrival, and time of flight with respect to communications with the portable device.

11. The method of claim 7 wherein the sensed characteristic is at least one of an environmental characteristic and a characteristic of communications transmitted from another of the plurality of sensor devices.

12. The method of claim 1 wherein said obtaining includes at least one of a) receiving the sensed characteristic via communications with another sensor device and b) sensing the sensed characteristic in at least one of the first sensor device and the second sensor device.

13. A system for collecting sensor information pertaining to a portable device, said system comprising:
    a first sensor device configured to communicate first sensor information, the first sensor device configured to obtain a first sensed characteristic that is based on communications with the portable device, the first sensor device configured to generate the first sensor information indicative of the first sensed characteristic, the first sensor device configured to obtain the first sensed characteristic by at least one of sensing the first sensed characteristic and receiving the first sensed characteristic from another sensor device;
    a second sensor device configured to communicate second sensor information, the second sensor device configured to obtain a second sensed characteristic that is based on communications with the portable device, the second sensor device configured to generate the second sensor information indicative of the second sensed characteristic, the second sensor device configured to obtain the second sensed characteristic by at least one of sensing the second sensed characteristic and receiving the second sensed characteristic from another sensor device;

a communication controller configured to collect the first and second sensor information generated by the first and second sensor devices;

wherein the first sensor device is configured to collect the second sensor information from the second sensor device via a sensor-based communication link established between the first sensor device and the second sensor device; and wherein the first sensor device is operable to transmit the first and second sensor information to the communication controller via a controller-based communication link established between the first sensor device and the communication controller.

14. The system of claim 13 wherein the first sensor device generates an aggregate data packet with the second sensor information received from the second sensor device and the first sensor information generated in the first sensor device, wherein the first sensor device transmits the aggregate data packet to the communication controller.

15. The system of claim 13 wherein the first sensor device only obtains the first sensed characteristic by receiving the first sensed characteristic from another sensor device.

16. The system of claim 13 wherein the first sensed characteristic is sensed by the first sensor device and is different from the second sensed characteristic that is sensed by the second sensor device.

17. The system of claim 13 wherein the communication controller is configured to transmit a command packet to the first and second sensor devices, wherein the command packet includes configuration information to allow the first and second sensor devices to respectively obtain the first and second sensed characteristics .

18. The system of claim 13 wherein the first and second sensed characteristics are respectively at least one of signal strength, angle of arrival, and time of flight with respect to communications received from the portable device, and wherein the portable device communicates data to the communication controller.

19. The system of claim 13 wherein communications with the communication controller are conducted in accordance with a communication protocol;

wherein communications among the first and second sensor devices are conducted in accordance with a sensor-based communication protocol; and wherein the communication controller communicates connection parameters to the first and second sensor devices regarding communications with the portable device to facilitate receipt of communications transmitted via a communication link with the portable device.

20. The system of claim 19 wherein communications between the portable device and the communication controller are at least one of Bluetooth low energy and Ultra-wide Band.

* * * * *